United States Patent
Ookawa et al.

(10) Patent No.: US 9,843,216 B2
(45) Date of Patent: Dec. 12, 2017

(54) COIL PRINTED CIRCUIT BOARD, POWER RECEPTION MODULE, BATTERY UNIT AND POWER RECEPTION COMMUNICATION MODULE

(71) Applicant: Nitto Denko Corporation, Osaka (JP)

(72) Inventors: Tadao Ookawa, Osaka (JP); Emiko Tani, Osaka (JP); Akihito Matsutomi, Osaka (JP); Shotaro Masuda, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 106 days.

(21) Appl. No.: 14/891,106

(22) PCT Filed: Apr. 3, 2014

(86) PCT No.: PCT/JP2014/001947
§ 371 (c)(1),
(2) Date: Nov. 13, 2015

(87) PCT Pub. No.: WO2014/184998
PCT Pub. Date: Nov. 20, 2014

(65) Prior Publication Data
US 2016/0094082 A1  Mar. 31, 2016

(30) Foreign Application Priority Data

May 13, 2013  (JP) .................. 2013-101467

(51) Int. Cl.
*H02J 17/00* (2006.01)
*H02J 7/02* (2016.01)
(Continued)

(52) U.S. Cl.
CPC .......... *H02J 7/025* (2013.01); *H01F 27/2804* (2013.01); *H01F 27/29* (2013.01);
(Continued)

(58) Field of Classification Search
CPC ....... H02J 7/025; H02J 17/00; H01F 27/2804; H01F 27/29; H01F 2027/2809
(Continued)

(56) References Cited

U.S. PATENT DOCUMENTS 7,870,665 B2 * 1/2011 Nomura et al. .... H01F 17/0013
205/125
8,169,185 B2   5/2012 Partovi et al.
(Continued)

FOREIGN PATENT DOCUMENTS

CN    1781166 A    5/2006
CN    101304183 A   11/2008
(Continued)

OTHER PUBLICATIONS

International Search Report dated Jul. 15, 2014 in International Application No. PCT/JP2014/001947.
(Continued)

*Primary Examiner* — Sun Lin
(74) *Attorney, Agent, or Firm* — Panitch Schwarze Belisario & Nadel LLP

(57) ABSTRACT

A first coil portion is formed in a first coil region of an upper surface of an insulating layer, and a second coil portion is formed on a lower surface of the insulating layer. A second terminal is formed at a position outside the first coil region. One or more intersection regions, in which a path, extending from an inner end of the first coil portion to the second terminal, intersects the first coil portion, are provided on the upper surface. The first coil portion is parted in each intersection region. A second lead portion passes between one portion and another portion of the first coil portion parted in said each intersection region and extends from the inner end of the first coil portion to the second terminal. The first coil portion and the second coil portion are connected together in parallel via through holes formed in the insulating layer.

11 Claims, 14 Drawing Sheets

(51) Int. Cl.
*H01F 38/14* (2006.01)
*H01F 27/28* (2006.01)
*H01F 27/29* (2006.01)
*H02J 50/10* (2016.01)

(52) U.S. Cl.
CPC .............. *H01F 38/14* (2013.01); *H02J 17/00* (2013.01); *H01F 2027/2809* (2013.01); *H02J 50/10* (2016.02)

(58) Field of Classification Search
USPC .......................................................... 320/108
See application file for complete search history.

(56) References Cited

U.S. PATENT DOCUMENTS

| | | | |
|---|---|---|---|
| 2003/0076211 | A1 | 4/2003 | Matsuta et al. |
| 2005/0073025 | A1 | 4/2005 | Hashizume et al. |
| 2008/0129439 | A1 | 6/2008 | Nishikawa et al. |
| 2008/0164840 | A1* | 7/2008 | Kato et al. .......... H01F 27/2804 320/108 |
| 2008/0164844 | A1 | 7/2008 | Kato et al. |
| 2008/0262611 | A1 | 10/2008 | Li et al. |
| 2009/0278649 | A1 | 11/2009 | Tatsukawa et al. |
| 2011/0100527 | A1 | 5/2011 | Tatsukawa et al. |
| 2013/0257362 | A1* | 10/2013 | Lim et al. ................. H01Q 7/00 320/108 |
| 2015/0244203 | A1* | 8/2015 | Kurz et al. .............. H01F 38/14 320/108 |
| 2016/0013665 | A1 | 1/2016 | Lim et al. |
| 2016/0049729 | A1* | 2/2016 | Chan et al. .............. H01Q 1/40 343/868 |

FOREIGN PATENT DOCUMENTS

| | | |
|---|---|---|
| CN | 101523693 A | 9/2009 |
| JP | H08203736 A | 8/1996 |
| JP | H08203739 A | 8/1996 |
| JP | 2002325013 A | 11/2002 |
| JP | 2003067682 A | 3/2003 |
| JP | 2004095860 A | 3/2004 |
| JP | 2005347286 A | 12/2005 |
| JP | 2008172873 A | 7/2008 |
| JP | 2008205216 A | 9/2008 |
| JP | 2009545876 A | 12/2009 |
| JP | 2011082212 A | 4/2011 |
| JP | 2011187559 A | 9/2011 |
| JP | 2011193093 A | 9/2011 |
| JP | 2013008859 A | 1/2013 |
| JP | 2014112728 A | 6/2014 |
| TW | 200410376 A | 6/2004 |
| WO | 2004070746 A1 | 8/2004 |
| WO | 2006008878 A1 | 1/2006 |
| WO | 2008016273 A1 | 2/2008 |

OTHER PUBLICATIONS

Yu et al., "Watt-Level Wireless Power Transfer Based on Stacked Flex Circuit Technology," Proceedings of 2011 Electronic Components and Technology Conference, pp. 2185-2191 (2011).
Office Action dated Dec. 19, 2016 in CN Application No. 201480028002.
Extended European Search Report dated Dec. 23, 2016 in EP Application No. 14798405.
Office Action dated May 9, 2017 in JP Application No. 2013-101467.
Office Action dated Sep. 11, 2017 in CN Application No. 201480028002.X.

* cited by examiner

F I G. 10
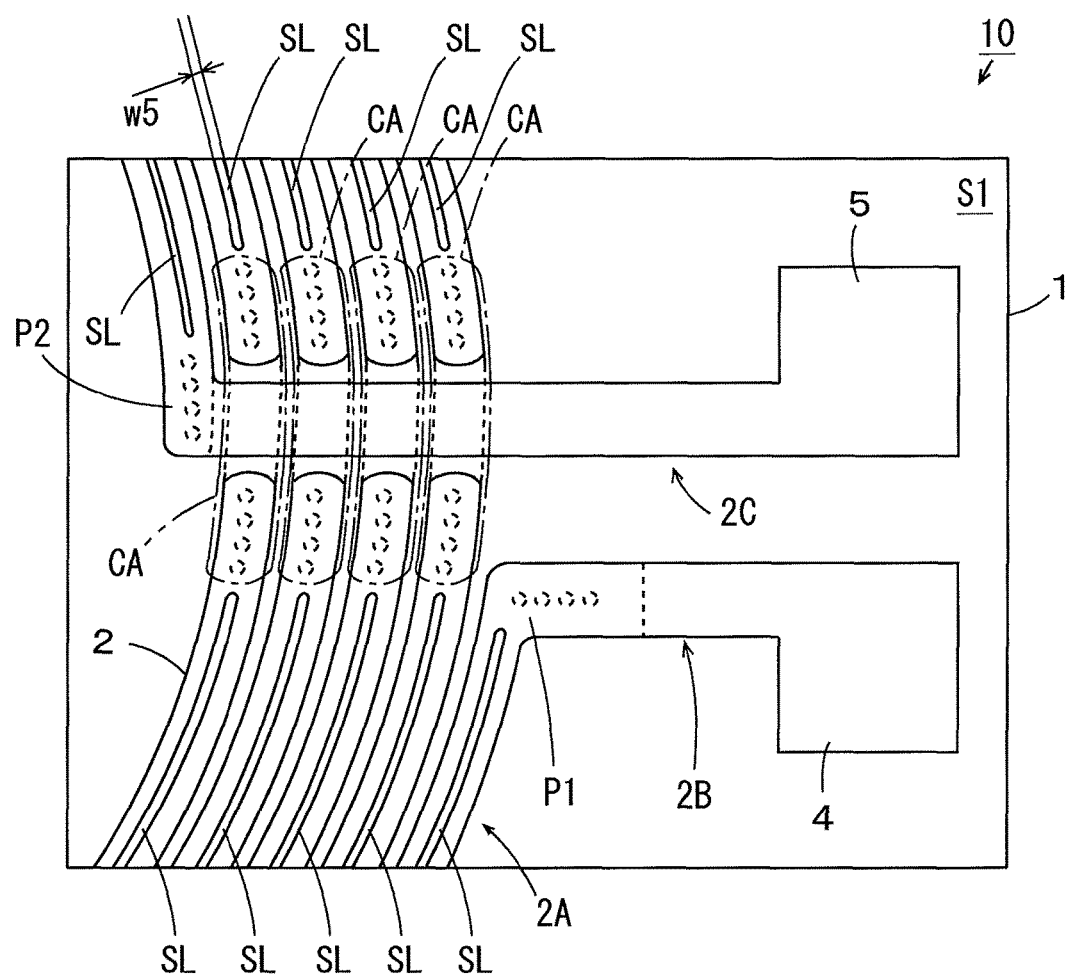

COIL PRINTED CIRCUIT BOARD, POWER RECEPTION MODULE, BATTERY UNIT AND POWER RECEPTION COMMUNICATION MODULE

CROSS-REFERENCE TO RELATED APPLICATIONS

This application is a Section 371 of International Application No. PCT/JP2014/001947, filed Apr. 3, 2014, which was published in the Japanese language on Nov. 20, 2014, under International Publication No. WO 2014/184998 A1 and the disclosure of which is incorporated herein by reference.

BACKGROUND OF THE INVENTION

Technical Field

The present invention relates to a coil printed circuit board, a power reception module, a battery unit and a power reception communication module.

Background Art

As techniques for supplying electric power by wireless communication, an electromagnetic induction-type wireless power supply system, a magnetic resonance-type wireless power supply system and a radio reception-type wireless power supply system are known. For example, in a field of battery devices for charging second batteries incorporated in mobile devices such as cellular telephones, the electromagnetic induction-type wireless power supply system and the magnetic resonance-type wireless power supply system, in particular, are often used. In the electromagnetic induction-type wireless power supply system and the magnetic resonance-type wireless power supply system, wireless power transmission and wireless power reception are performed between a power transmission coil and a power reception coil. In International Standard "Qi" for the wireless power supply system, the wireless power transmission and the wireless power reception are performed in a frequency band of about 100 kHz to 200 kHz by the electromagnetic induction type.

The above-mentioned power reception coil is incorporated in the mobile device while being close to the second battery, for example. There are secondary batteries that markedly easily deteriorate in an environment of a temperature exceeding an allowable value such as lithium-ion batteries. Therefore, in order to prevent deterioration of such a secondary battery, a power reception coil that does not generate heat to a temperature exceeding an allowable value even when used in the frequency band of about 100 kHz to 200 kHz is required.

The larger a resistance component of the power reception coil is, the higher an amount of heat generation of the power reception coil during the wireless power supply is. Further, the resistance component of the power reception coil increases due to the skin effect and the proximity effect as the frequency increases.

In an air-core coil described in Patent Document 1, a wiring trace is spirally formed on one surface of an electrically insulating film. In this manner, the coil in which the spiral wiring trace is formed on only one surface of the electrically insulating film is referred to as a single-layer coil. The single-layer coil causes the proximity effect to be inhibited. Therefore, when the single-layer coil is used as the power reception coil, an increase in amount of heat generation of the power reception coil can be inhibited regardless of the used frequency band.

Patent Document 1: JP 2002-325013 A
Patent Document 2: US Patent Application Publication No. 2008/0262611 A1
Non-Patent Document 1: Xuehong Yu, Florian Herrault, Chang-Hyeon Ji, Seong-Hyok Kim, Mark G. Allen Gianpaolo Lisi, Luu Nguyen, and David I. Anderson, "Watt-Level Wireless Power Transfer Based on Stacked Flex Circuit Technology" Proc. Of 2011 Electronic Components and Technology Conference, pp. 2185-2191

Technical Problem

It is necessary to design a maximum outer diameter of the power reception coil incorporated in the mobile device to be smaller than the size of the mobile device. Therefore, when the above-mentioned single-layer coil is used as the power reception coil, it is difficult to increase the width, the space and the number of turns of the wiring trace. On the one hand, in the wireless power supply system, it is required to increase an amount of power that can be supplied per unit time. Thus, a charging time period of the secondary battery incorporated in the mobile device can be shortened.

In order to increase the amount of power that can be supplied per unit time, it is considered that current capacity of the single-layer coil is increased by an increase in thickness of the wiring trace.

However, dimension accuracy of the wiring trace decreases as the thickness of the wiring trace increases. Further, a formation process of the wiring trace is complicated as the thickness of the wiring trace increases. Therefore, it is difficult to actually use the single-layer coil as the power reception coil.

In a two-layer metal structure described in Patent Document 2, two spirally formed wiring traces are connected in series to each other and arranged to overlap with each other. The two-layer metal structure causes the two wiring traces to be laminated. Therefore, the number of turns of the wiring trace formed in each layer can be ½ as compared to the above-mentioned single-layer coil having the same maximum outer diameter. Thus, the width and the space of the wiring trace can be increased. Therefore, it is not necessary to increase the thickness of the wiring trace.

However, in the two-layer metal structure, a resistance value of the wiring trace in each layer increases due to the proximity effect. Further, a combined resistance value of whole of the wiring traces in the two layers is equal to the sum of the resistance values of the wiring traces in the two layers. Therefore, the resistance component of the two-layer metal structure increases as the frequency increases due to the proximity effect.

In contrast, in a flexible circuit described in Non-Patent Document 1, spirally formed four wiring traces are connected in parallel to each other and arranged to overlap with one another. The combined resistance value of whole of the four wiring traces connected in parallel is equal to a reciprocal of the sum of respective reciprocals of the resistance values of the four wiring traces. Therefore, even when the resistance value of the wiring trace in each layer increases due to the proximity effect, the combined resistance value of whole of the four wiring traces does not markedly increase.

However, in the flexible circuit of Non-Patent Document 1, two terminals for supplying currents to the four wiring traces are provided inside and outside of the spirally formed wiring traces. Therefore, when the flexible circuit of Non-Patent Document 1 is attached to a mobile device, it is necessary to connect a jumper wire to an inner terminal of the wiring trace. A connection work of such a jumper wire is complicated and supplies restriction to an assembly process of the mobile device.

BRIEF SUMMARY OF THE INVENTION

An object of the present invention is to provide a coil printed circuit board that inhibits an increase in resistance component over a wide frequency band and capable of facilitating a connection work to another electronic device, and a power reception module including the coil printed circuit board, a battery unit including the coil printed circuit board and a power reception communication module including the coil printed circuit board.

Solution to Problem (1) A coil printed circuit board according to one aspect of the present invention includes a first insulating layer having first and second surfaces that are opposite to each other, a first coil portion spirally formed in a first region on the first surface of the first insulating layer, a second coil portion spirally formed in a second region on the second surface of the first insulating layer, a first terminal formed outside of the first region on the first surface or outside of the second region on the second surface and is electrically connected to an outer end of the first coil portion, and a second terminal formed outside of the first region on the first surface or outside of the second region on the second surface, wherein the first and second coil portions are electrically connected in parallel to each other, one or plurality of intersection regions in which a path extending from an inner end of the first coil portion to outside of the first region intersects with the first coil portion on the first surface, the first coil portion is parted in each intersection region, a lead portion is formed on the first surface to extend from the inner end of the first coil portion to outside of the first region on the path, the lead portion is arranged to pass between one and another portions of the first coil portion parted in each intersection region, the second terminal is electrically connected to the lead portion outside of the first region, the first insulating layer has first and second through holes in each intersection region, and the one and other portions of the first coil portion parted in each intersection region are electrically respectively connected to the second coil portion via the first and second through holes.

In the coil printed circuit board, the first coil portion is formed in the first region on the first surface of the first insulating layer. The second coil portion is formed in the second region on the second surface of the first insulating layer. The second coil portion is electrically connected in parallel to the first coil portion. The one or plurality of intersection regions in which the path extending from the inner end of the first coil portion to the outside of the first region intersects with the first coil portion on the first surface are provided. The first coil portion is parted in the one or plurality of intersection regions. The first insulating layer has the first and second through holes in each intersection region. The one and other portions of the first coil portion parted in each intersection region are respectively electrically connected to the second coil portion via the first and second through holes. In this manner, the one and other portions of the first coil portion parted in each intersection region is electrically connected via part of the second coil portion. Thus, the first coil portion has electrical continuity.

The first terminal is formed outside of the first region on the first surface or outside of the second region on the second surface and is electrically connected to the outer end of the first coil portion. The second terminal is formed outside of the first region on the first surface or outside of the second region on the second surface. The lead portion extends from the inner end of the first coil portion to the outside of the first region to pass between the one and other portions of the first coil portion parted in each intersection region on the first surface. The second terminal is formed outside of the first region on the first surface or outside of the second region on the second surface and is electrically connected to the lead portion outside of the first region. Thus, the outer end and the inner end of the first coil portion are electrically connected to the first and second terminals, respectively.

The higher the frequency is due to the proximity effect, the larger the resistance value of each of the first and second coil portions is. The first and second coil portions are connected in parallel to each other except for the portion parted in each intersection region. On the one hand, in each intersection region, the first and second coil portions are constituted by common line portions. In this case, the combined resistance value of whole of the first and second coil portions is smaller than each of the resistance values of the first and second coil portions. Therefore, even when the resistance value of each of the first and second coil portions increases due to the proximity effect, the combined resistance value of whole of the first and second coil portions does not markedly increase. Therefore, an increase in resistance component is inhibited over a wide frequency band.

Further, the first and second terminals are formed outside of the first region and outside of the second region of the first insulating layer, and the inner end of the first coil portion is connected to the second terminal by the lead portion. In this case, it is not necessary to extend the inner end of the first coil portion to the outside of the first coil portion using the connection member such as a jumper wire. Thus, the connection work between the first coil portion and another electronic device is facilitated.

As a result, an increase in resistance component is inhibited over a wide frequency band, and the connection work to another electronic device is facilitated.

(2) The first insulating layer may have a third through hole between the inner end of the first coil portion and an inner end of the second coil portion, and the inner end of the first coil portion and the inner end of the second coil portion may be electrically connected to each other via the third through hole.

In this case, the inner end of the second coil portion is electrically connected to the inner end of the first coil portion without the use of the connection member such as the jumper wire. The third through hole can be formed in the common step with the first and second through holes. Thus, the number of components and the number of steps of manufacturing the coil printed circuit board can be decreased.

(3) The first insulating layer may have a fourth through hole between the outer end of the first coil portion and an outer end of the second coil portion, and the outer end of the first coil portion and the outer end of the second coil portion may be electrically connected to each other via the fourth through hole.

In this case, the outer end of the second coil portion is electrically connected to the outer end of the first coil portion without the use of the connection member such as the jumper wire. The fourth through hole can be formed in the common step with the first and second through holes. Thus, the number of components and the number of steps of manufacturing the coil printed circuit board can be decreased.

(4) The lead portion may have a width larger than the first coil portion.

In this case, it is possible to decrease the resistance value per unit length of the lead portion to be smaller than the resistance value per unit length of the first coil portion without increasing the thickness of the lead portion to be larger than the thickness of the first coil portion. Thus, an increase in resistance value between the first terminal and the second terminal caused by the lead portion is prevented.

(5) The coil printed circuit board may include one or plurality of second insulating layers respectively having third and fourth surfaces that are opposite to each other, and a third coil portion spirally formed in a third region on the fourth surface of each second insulating layer, wherein the third coil portion may be electrically connected in parallel to the second coil portion, each second insulating layer may be laminated on the second surface of the first insulating layer or the fourth surface of another second insulating layer such that the third surface is closer to the second surface than the fourth surface and has fifth and sixth through holes formed at positions respectively overlapping with the first and second through holes of the first insulating layer, the first terminal may be formed outside of the first region on the first surface or outside of the third region on the fourth surface of the second insulating layer provided at a position farthest from the first insulating layer, the second terminal may be formed outside of the first region on the first surface or outside of the third region on the fourth surface of the second insulating layer provided at a position farthest from the first insulating layer, the one portion of the first coil portion parted in each intersection region may be electrically connected to the third coil portion of each second insulating layer via the first and fifth through holes, and the other portion of the first coil portion parted in each intersection region may be electrically connected to the third coil portion of each second insulating layer via the second and sixth through holes.

In this case, the one portion of the first coil portion parted in each intersection region is electrically connected to the third coil portion of each second insulating layer via the first and fifth through holes. Further, the other portion of the first coil portion parted in each intersection region is electrically connected to the third coil portion of each second insulating layer via the second and sixth through holes. In this manner, the one and other portions of the first coil portion parted in each intersection region are electrically connected to each other via part of the third coil portion of each second insulating layer. Further, the third coil portion of each second insulating layer is electrically connected in parallel to the second coil portion. From these, the third coil portion of each second insulating layer and the first and second coil portions are connected in parallel to one another except for the portion parted in each intersection region.

The combined resistance value of whole of each third coil portion of the one or plurality of second insulating layers and the first and second coil portions is sufficiently smaller than the resistance value of each third coil portion of the one or plurality of second insulating layers and the first and second coil portions. Therefore, even when the resistance value of each third coil portion of the one or plurality of second insulating layers and each of the first and second coil portions increases due to the proximity effect, the combined resistance value of whole of each third coil portion of the one or plurality of second insulating layers and the first and second coil portions does not increase. Therefore, an increase in resistance component is sufficiently inhibited over a wide frequency band.

Further, the first and second terminals are formed outside of the first region of the first insulating layer and outside of the third region of the second insulating layer provided at a position farthest from the first insulating layer, and the inner end of the first coil portion is connected to the second terminal by the lead portion. Even in this case, it is not necessary to extend the inner end of the first coil portion to the outside of the first coil portion using the connection member such as the jumper wire. Thus, the connection work between the first coil portion and another electronic device is facilitated.

(6) The first terminal and the second terminal may be formed on the first surface.

In this case, the first coil portion, the lead portion, the first terminal and the second terminal can be formed on the first surface in the common step. Thus, the number of the steps of manufacturing the coil printed circuit board can be decreased. Further, an operator can perform the connection work between the first coil portion and another electronic device without reversing the first insulating layer while facing the first surface of the first insulating layer. Therefore, the connection work between the first coil portion and another electronic device is more sufficiently facilitated.

(7) A slit extending in a circumferential direction may be formed in at least part of the first and second coil portions.

In this case, in a line portion in which each slit extending in the circumferential direction is formed of the first and second coil portions, a cross section orthogonal to the circumferential direction is parted by the slit. Thus, the width of each parted line portion decreases, so that the resistance value of each parted line portion is unlikely to be influenced by the skin effect. Therefore, an increase in resistance component due to the skin effect is inhibited even when the frequency increases.

(8) A power reception module according to another aspect of the present invention includes the above-mentioned coil printed circuit board, wherein the first and second coil portions of the coil printed circuit board are configured to receive power sent by electromagnetic induction or magnetic resonance.

The power reception module includes the above-mentioned coil printed circuit board. The above-mentioned coil printed circuit board causes an increase in resistance component to be inhibited over a wide frequency band and the connection work to another electronic device to be facilitated. Therefore, the power reception module that can be operated with a low power loss in a wide frequency band can be easily fabricated at a low cost.

(9) A battery unit according to yet another aspect of the present invention includes the above-mentioned power reception module, a secondary battery, and a charger configured to charge the secondary battery by power received by the power reception module.

The battery unit includes the above-mentioned power reception module. Thus, the battery unit that can be operated with a low power loss in a wide frequency band can be easily fabricated at a low cost.

(10) A power reception communication module according to yet another aspect of the present invention includes the above-mentioned coil printed circuit board, wherein the first and second coil portions of the coil printed circuit board are configured to receive power sent by electromagnetic induction or magnetic resonance, one or plurality of reception coil portions are formed on at least one surface of the first surface and the second surface of the first insulating layer of the coil printed circuit board, and each reception coil portion is configured to receive a signal sent by wireless communication.

The power reception communication module includes the above-mentioned coil printed circuit board. The above-mentioned coil printed circuit board causes an increase in resistance component to be inhibited over a wide frequency band and the connection work to another electronic device to be facilitated. Therefore, the wireless power reception module that can be operated with a low power loss in a wide frequency band can be easily fabricated at a low cost.

Further, the one or plurality of reception coil portions are formed on at least one of the first surface and the second surface of the first insulating layer of the coil printed circuit board. In this case, the power sent by the electromagnetic induction or the magnetic resonance is received by the first and second coil portions, and a signal sent by the wireless communication is received by the reception coil portion. Therefore, the wireless power reception and the wireless reception can be performed with a compact configuration.

Further, the reception coil portion can be formed in the common step with at least one of the first and second coil portions. Therefore, it is not necessary to individually form the reception coil portion, so that an increase in number of steps of manufacturing the coil printed circuit board used for the power reception communication module is inhibited.

(11) A power reception communication module according to yet another aspect of the present invention includes the above-mentioned coil printed circuit board, wherein the first, second and third coil portions of the coil printed circuit board are configured to receive power sent by electromagnetic induction or magnetic resonance, one or plurality of reception coil portions are formed on at least one surface of the first and second surfaces of the first insulating layer and the third and the fourth surfaces of the one or plurality of second insulating layers of the coil printed circuit board, and each reception coil portion is configured to receive a signal sent by wireless communication.

The power reception communication module includes the above-mentioned coil printed circuit board. The above-mentioned coil printed circuit board causes an increase in resistance component to be inhibited over a wide frequency band and the connection work to another electronic device to be facilitated. Therefore, the wireless power reception module that can be operated with a low power loss in a wide frequency band can be easily fabricated at a low cost.

Further, the one or plurality of reception coil portions are formed on at least one of the first surface and the second surface of the first insulating layer and each the third surface and each fourth surface of the one or plurality of second insulating layers of the coil printed circuit board. In this case, the power sent by the electromagnetic induction or the magnetic resonance is received by the first, second and third coil portions, and a signal sent by the wireless communication is received by the reception coil portion. Therefore, the wireless power reception and the wireless reception can be performed with a compact configuration.

Further, the reception coil portion can be formed in the common step with at least one of the first, second and third coil portions. Therefore, it is not necessary to individually form the reception coil portion, so that an increase in number of steps of manufacturing the coil printed circuit board used for the power reception communication module is inhibited.

Advantageous Effects of Invention

The present invention causes an increase in resistance component of the coil to be inhibited over a wide frequency band and realizes facilitation of the connection work between the coil and another electronic device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 10 is a diagram for explaining yet another example of the configuration of the coil printed circuit board;

DETAILED DESCRIPTION OF THE INVENTION

A coil printed circuit board, a power reception module, a battery unit, a power reception communication module and a method of manufacturing the coil printed circuit board according to one embodiment of the present invention will be described below with reference to drawings. The coil printed circuit board according to the present embodiment has flexibility and is used as a power reception coil of a wireless power supply system that supplies power by wireless communication, for example.

[1] Basic Configuration of Coil Printed Circuit Board

Figure 1A:
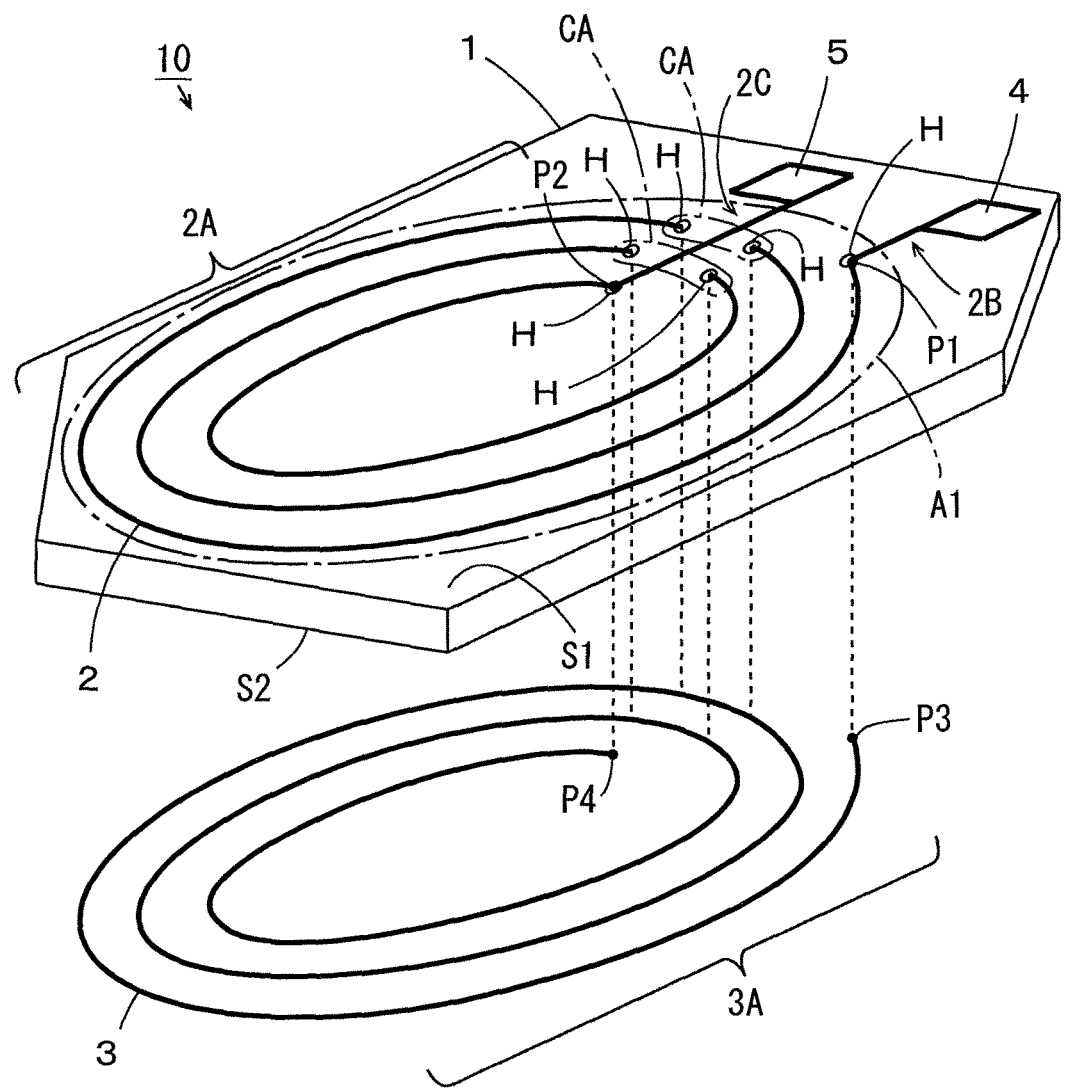
FIGS. 1A and 1B are diagrams for explaining a basic configuration of a coil printed circuit board according to one embodiment of the present invention.
Figure 1B:
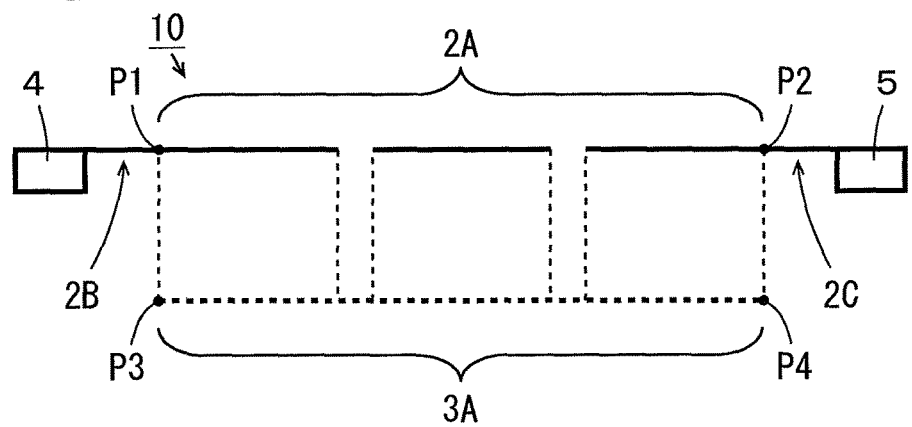

FIGS. 1A-1B are diagrams for explaining a basic configuration of the coil printed circuit board according to one embodiment of the present invention. An exploded perspective view of the coil printed circuit board 10 is schematically shown in FIG. 1A. As shown in FIG. 1A, the coil printed circuit board 10 according to the present embodiment includes an insulating layer 1, a first wiring trace 2, a second wiring trace 3, a first terminal 4 and a second terminal 5. The insulating layer 1 has an upper surface S1 and a lower surface S2 opposite to each other.

The first wiring trace 2 is formed on the upper surface S1 of the insulating layer 1, and the second wiring trace 3 is formed on the lower surface S2 of the insulating layer 1. In FIG. 1A, the second wiring trace 3 is shown at a position spaced apart from the insulating layer 1 in order to facilitate understanding of the shape of the second wiring trace 3.

A first coil region A1 having a predetermined shape is set on the upper surface S1 of the insulating layer 1, and a second coil region A2 having a predetermined shape (see FIGS. 2A-2B, described below) is set on the lower surface S2 of the insulating layer 1. At least part of the first coil region A1 and at least part of the second coil region A2 overlap with each other. In the present example, the first coil region A1 and the second coil region A2 have the same circular shape, and the entire first coil region A1 and the entire second coil region A2 overlap with each other.

On the upper surface S1 of the insulating layer 1, the first terminal 4 and the second terminal 5 are respectively formed at two positions spaced apart from each other outside of the first coil region A1. The first terminal 4 and the second terminal 5 are configured such that they can be connected to other electronic devices (AC-DC conversion circuits 330, 530 and the like of FIGS. 13 and 14, described below).

The first wiring trace 2 includes a first coil portion 2A, a first lead portion 2B and a second lead portion 2C. The first coil portion 2A of the first wiring trace 2 is spirally formed on the first coil region A1.

The first lead portion 2B of the first wiring trace 2 is formed to connect an outer end P1 of the first coil portion 2A to the first terminal 4. Thus, the outer end P1 of the first coil portion 2A and the first terminal 4 are electrically connected to each other.

In the first coil region A1, one or plurality (two in the present example) of intersection regions CA in which a path extending from an inner end P2 of the first coil portion 2A to the second terminal 5 intersects with the first coil portion 2A are provided. The first coil portion 2A is parted in each intersection region CA.

The second lead portion 2C of the first wiring trace 2 is formed to pass between one and the other portions of the first coil portion 2A parted in each intersection region CA and extend from the inner end P2 of the first coil portion 2A to the second terminal 5. Thus, the inner end P2 of the first coil portion 2A and the second terminal 5 are electrically connected to each other.

The second wiring trace 3 includes a second coil portion 3A. The second coil portion 3A has the same shape as the first coil portion 2A of the first wiring trace 2 except for not being parted. Thus, the second coil portion 3A has the same minimum inner diameter and maximum outer diameter as the first coil portion 2A and is continuously spirally formed on the second coil region A2.

In at least each above-mentioned intersection region CA, the first coil portion 2A and the second coil portion 3A overlap with each other. In the present example, the first coil portion 2A and the second coil portion 3A overlap with each other also in a region except for each intersection region CA.

In the insulating layer 1, a plurality of through holes H are formed. In the present example, a through hole H is formed in a portion, of the insulating layer 1, that overlaps with the outer end P1 of the first coil portion 2A, and a through hole H is formed in a portion, of the insulating layer 1, that overlaps with the inner end P2 of the first coil portion 2A. Further, a through hole H is formed in each portion, of the insulating layer 1, that overlaps with the one and other portions of the first coil portion 2A parted in each intersection region CA.

Plating is respectively performed on inner peripheral surfaces of the plurality of through holes H. Alternatively, a conductive material is filled inside of the plurality of through holes H. Thus, the outer end P1 of the first coil portion 2A is electrically connected to an outer end P3 of the second coil portion 3A via each through hole H. Further, the inner end P2 of the first coil portion 2A is electrically connected to an inner end P4 of the second coil portion 3A via each through hole H.

Further, each of the one and other portions of the first coil portion 2A parted in each intersection region CA is electrically connected to the second coil portion 3A via each through hole H. In this case, the one and other portions of the first coil portion 2A parted in each intersection region CA is electrically connected to each other via part of the second coil portion 3A. Thus, the first coil portion 2A has electrical continuity.

In FIG. 1B, a relationship of electrical connection of the first coil portion 2A, the first lead portion 2B, the second lead portion 2C, the second coil portion 3A, the first terminal 4 and the second terminal 5 is schematically shown. As shown in FIG. 1B, in the coil printed circuit board 10 having the above-mentioned configuration, the first coil portion 2A and the second coil portion 3A are electrically connected in parallel to each other.

In the example of FIGS. 1A-1B, the one through hole H is formed in each of the outer end P1 and the inner end P2 of the first coil portion 2A and each portion, of the insulating layer 1, that overlaps with the one and other portions of the first coil portion 2A parted in each intersection region CA. However, the invention is not limited to this. The two, three or more than three through holes H may be formed in each portion of the insulating layer 1. It is possible to increase a cross sectional area of a current path between the first coil portion 2A and the second coil portion 3A without increasing the size of each through hole H by increasing the number of the through holes H formed in each portion of the insulating layer 1.

[2] Details of Configuration of Coil Printed Circuit Board

Figure 2A:
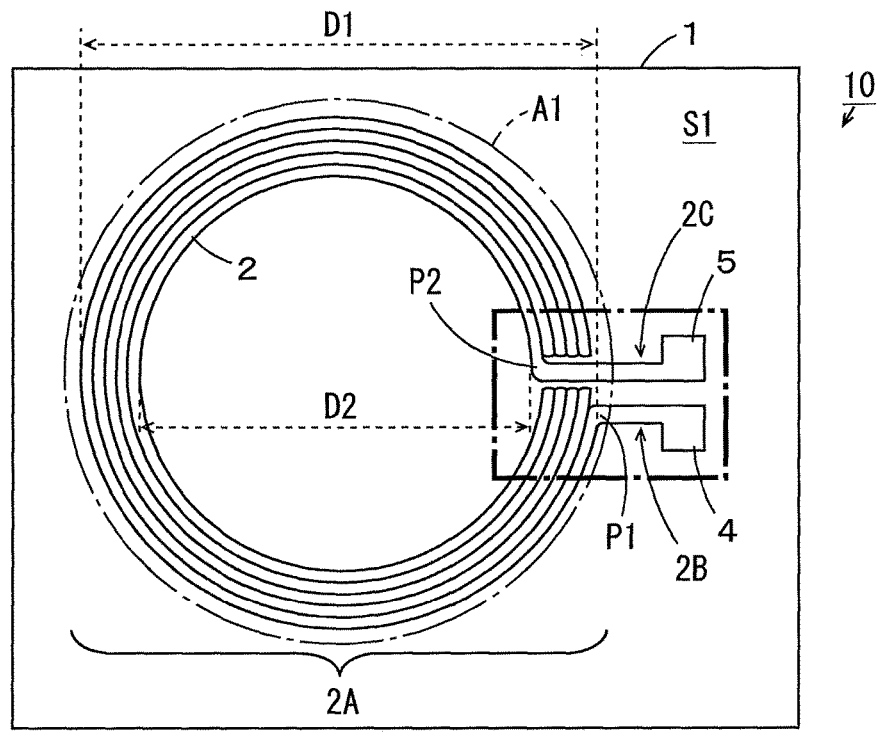
FIGS. 2A and 2B are diagrams showing a specific example of a configuration of the coil printed circuit board.
Figure 2B:
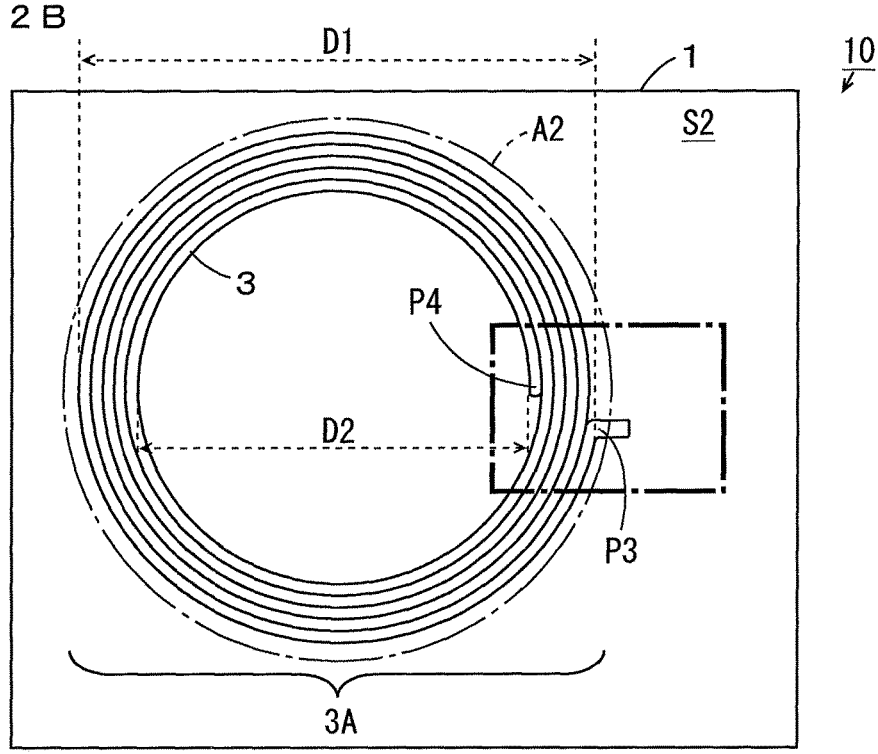

FIGS. 2A-2B are diagrams showing a specific example of the configuration of the coil printed circuit board 10. A plan view of the coil printed circuit board 10 of the present example as viewed from above is shown in FIG. 2A, and a plan view of the coil printed circuit board 10 of the present example as viewed from below is shown in FIG. 2B.

While the number of turns of the first coil portion 2A and the second coil portion 3A is 5 in the coil printed circuit board 10 of FIGS. 2A and 2B, the invention is not limited to this. The number of turns of the first coil portion 2A and the second coil portion 3A may be smaller than 5 or larger than 5.

A maximum outer diameter D1 of each of the first coil portion 2A and the second coil portion 3A is not less than 10 mm and not more than 200 mm, for example, is preferably not less than 20 mm and not more than 100 mm, and is more preferably not less than 20 mm and not more than 80 mm.

Further, a minimum inner diameter D2 of each of the first coil portion 2A and the second coil portion 3A is not less than 1 mm and not more than 100 mm, for example, is preferably not less than 5 mm and not more than 50 mm, and is more preferably not less than 5 mm and not more than 40 mm.

Figure 3A:
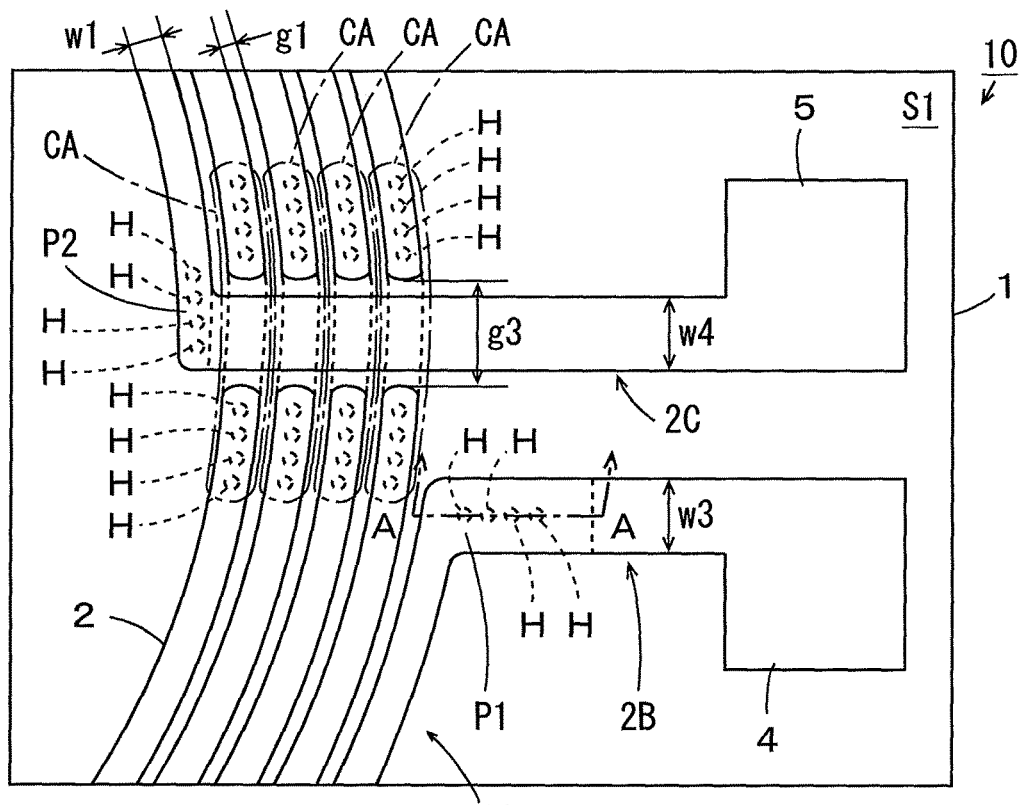
FIGS. 3A and 3B are partially enlarged plan views of the coil printed circuit board of FIGS. 2A and 2B.
Figure 3B:
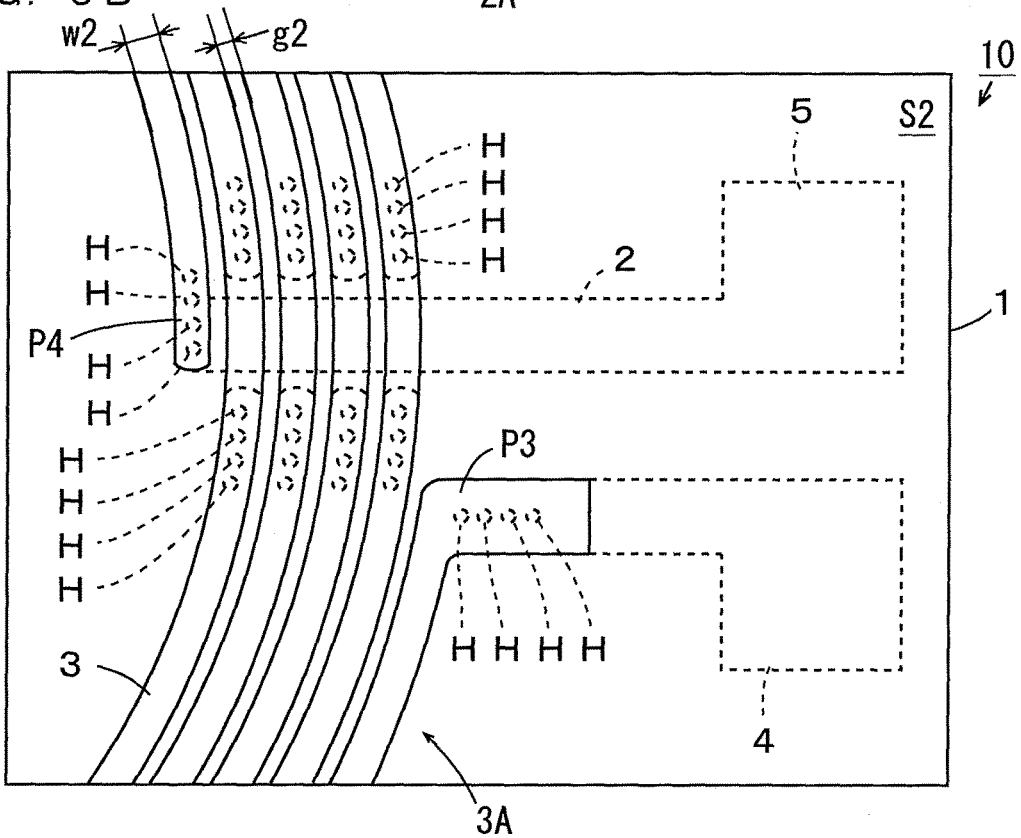

FIGS. 3A-3B are partially enlarged plan views of the coil printed circuit board 10 of FIGS. 2A-2B. An enlarged view of a portion surrounded by a thick one-dot and dash line of FIG. 2A is shown in FIG. 3A, and an enlarged view of a portion surrounded by a thick one-dot and dash line of FIG. 2B is shown in FIG. 3B.

The thickness of each of the first wiring trace 2 and the second wiring trace 3 is not less than 5 μm and not more than 100 μm, for example, and is preferably not less than 10 μm and not more than 80 μm.

Each of a width w1 of the first coil portion 2A of the first wiring trace 2 and a width w2 of the second coil portion 3A of the second wiring trace 3 is not less than 50 μm and not more than 10000 μm, for example, is preferably not less than 200 μm and not more than 5000 μm, and is more preferably not less than 200 μm and not more than 3000 μm. The widths w1, w2 may be equal to each other or different from each other.

Further, each of a distance g1 between each two adjacent portions in a direction orthogonal to a circumferential direction in the first coil portion 2A and a distance g2 between each two adjacent portions in the direction orthogonal to the circumferential direction in the second coil portion 3A is not less than 30 μm and not more than 5000 μm, for example, is preferably not less than 50 μm and not more than 1000 μm, and is more preferably not less than 50 μm and not more than 500 μm. The distances g1, g2 may be equal to each other or different from each other.

Each of widths w3, w4 of the first lead portion 2B and the second lead portion 2C is larger than the width w1 of the first coil portion 2A, and is not less than 100 μm and not more than 20000 μm, for example, and is preferably not less than 200 μm and not more than 10000 μm. In this case, it is possible to set a resistance value per unit length of each of the first and second lead portions 2B, 2C to be smaller than a resistance value per unit length of the first coil portion 2A without increasing the thickness of each of the first and second lead portions 2B, 2C to be larger than the thickness of the first coil portion 2A. Thus, an increase in resistance value between the first terminal 4 and the second terminal 5 by the first and second lead portions 2B, 2C is prevented. The widths w3, w4 may be equal to each other or different from each other.

A distance g3 between the one and other portions of the first coil portion 2A parted in each intersection region CA is larger than the width w4 of the second lead portion 2C, is not less than 150 μm and not more than 30000 μm, for example, and is preferably not less than 200 μm and not more than 20000 μm. In each intersection region CA, a gap is formed between each of the parted one portion and the parted other portion of the first coil portion 2A, and the second lead portion 2C.

The thickness of the insulating layer 1 is not less than 5 μm and not more than 1000 μm, for example, is preferably not less than 10 μm and not more than 100 μm, and is more preferably not less than 10 μm and not more than 50 μm. In the example of FIGS. 3A-3B, four through holes H are formed in each of the outer end P1 and the inner end P2 of the first coil portion 2A and each portion, of the insulating layer 1, that overlaps with the one and other portions of the first coil portion 2A parted in each intersection region CA.

An inner diameter of each through hole H is smaller than each of the widths w1, w2 of each of the first and second coil portions 2A, 3A, and not less than 5 μm and not more than 5000 μm, for example, is preferably not less than 10 μm and not more than 500 μm, and is more preferably not less than 10 μm and not more than 300 μm.

Figure 4A:
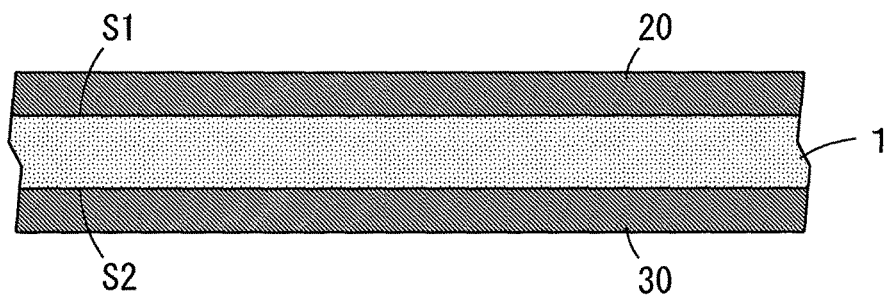
FIGS. 4A to 4D are cross sectional views showing steps of a first manufacturing example of the coil printed circuit board of FIGS. 2A to 3B.
Figure 4B:
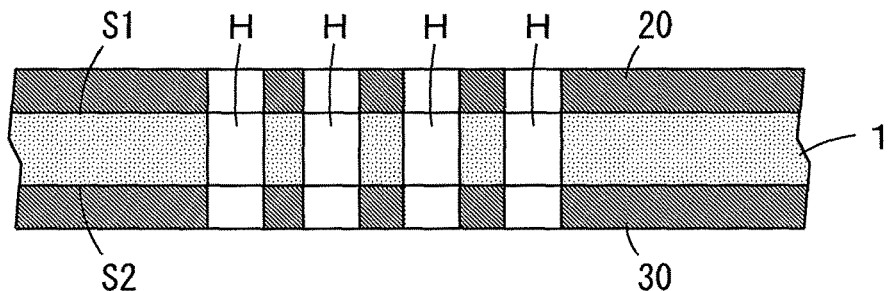

[3] Method of Manufacturing Coil Printed Circuit Board (1) First Manufacturing Example FIGS. 4A-4B are cross sectional views of steps showing the first manufacturing example of the coil printed circuit board 10 of FIGS. 2A to 3B. The cross sectional views shown in FIG. 4A-4D are equivalent to the cross sectional view taken along the line A-A of FIG. 3A.

First, as shown in FIG. 4A, a three-layer base material in which conductor layers 20, 30 are respectively laminated on the upper surface S1 and the lower surface S2 of the insulating layer 1 is prepared. The insulating layer 1 is made of polyimide, and the conductor layers 20, 30 are made of copper.

Next, as shown in FIG. 4B, the plurality of through holes H are formed in the insulating layer 1 and the conductor layers 20, 30 at a plurality of predetermined positions. Each through hole H can be formed by drilling, punching, laser processing or other processing.

Figure 4C:
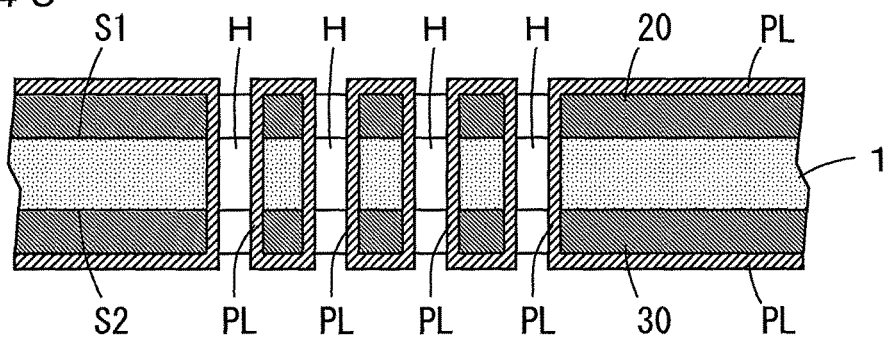

Next, as shown in FIG. 4C, a conductive plating layer PL is formed on the upper surface of the conductor layer 20 and an inner peripheral surface of each through hole H. Further, the conductive plating layer PL is formed on the lower surface of the conductor layer 30. The plating layer PL is made of copper. Thus, the conductor layer 20 and the plating layer PL on the upper surface S1 and the conductor layer 30 and the plating layer PL on the lower surface S2 of the insulating layer 1 are electrically connected to one another via the plurality of through holes H.

Figure 4D:
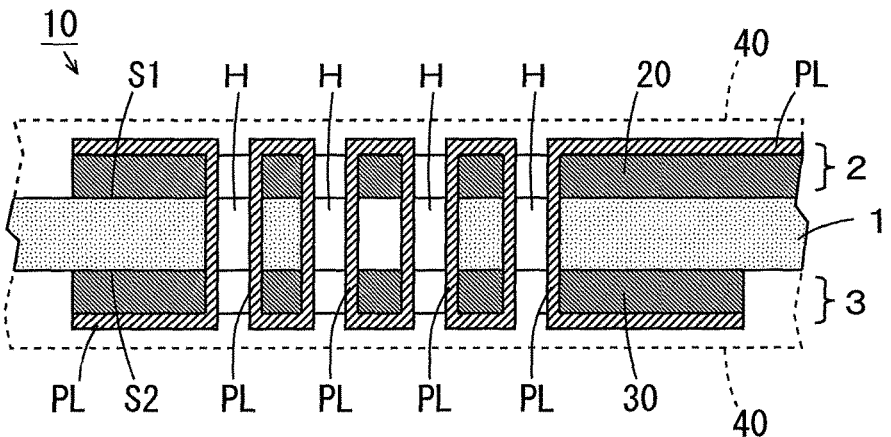

Next, as shown in FIG. 4D, part of the conductor layer 20 and part of the plating layer PL on the conductor layer 20 are etched. In this manner, the first wiring trace 2, the first terminal 4 and the second terminal 5 are formed on the upper surface S1 of the insulating layer 1 by a subtractive method. Further, part of the conductor layer 30 and part of the plating layer PL on the conductor layer 30 are etched. In this manner, the second wiring trace 3 is formed on the lower surface S2 of the insulating layer 1 by the subtractive method. Thus, the coil printed circuit board 10 of FIGS. 2 and 3 is completed.

As indicated by a dotted line in FIG. 4D, a cover insulating layer 40 made of polyimide may be formed on the upper surface S1 and the lower surface S2 of the insulating layer 1 to cover the first and second wiring traces 2, 3.

(2) Second Manufacturing Example

FIGS. 5A-5D are cross sectional views showing steps of the second manufacturing example of the coil printed circuit board 10 of FIGS. 2A to 3B. The cross sectional views shown in FIGS. 5A-5D are equivalent to the cross sectional view taken along the line A-A of FIG. 3A.

Figure 5A:
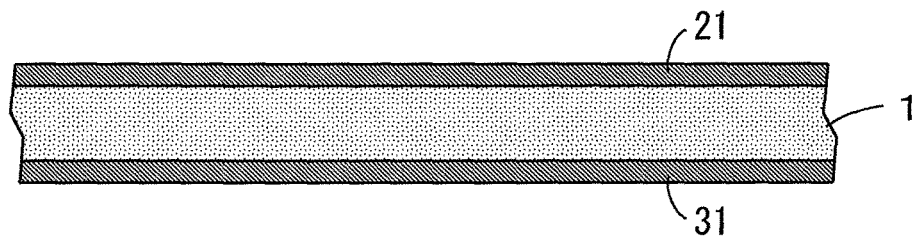
FIGS. 5A to 5D are cross sectional views showing steps of a second manufacturing example of the coil printed circuit board of FIGS. 2A to 3B.

First, as shown in FIG. 5A, a three-layer base material in which conductor layers 21, 31 are laminated on the upper surface S1 and the lower surface S2 of the insulating layer 1. The insulating layer 1 is made of polyimide, and the conductor layers 21, 31 are made of copper. The thickness of each of the conductor layers 21, 31 is smaller than the thickness of each of the conductor layers 20, 30 (FIG. 4A) of the first manufacturing example.

Figure 5B:
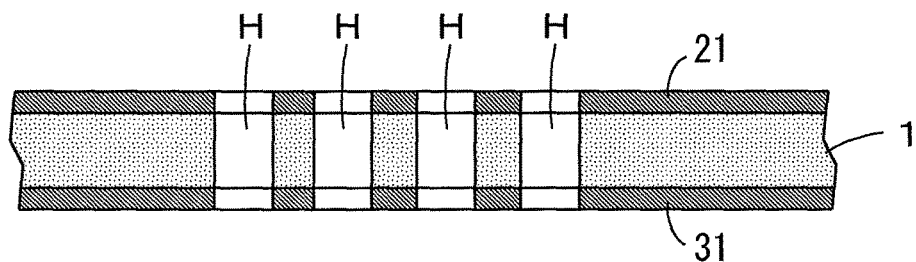

Next, as shown in FIG. 5B, the plurality of through holes H are formed in the insulating layer 1 and the conductor layers 21, 31 at a plurality of predetermined positions. Each through holes H can be formed by drilling, punching, laser processing or other processing.

Figure 5C:
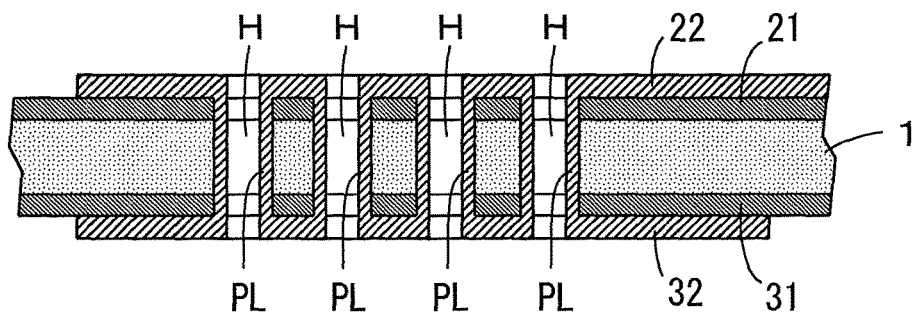

Next, as shown in FIG. 5C, a conductive plating layer 22 having a predetermined pattern is formed on the upper surface of the conductor layer 21, and a conductive plating layer PL is formed on the inner peripheral surface of each through hole H. Further, a conductive plating layer 32 having a predetermined pattern is formed on the lower surface of the conductor layer 31.

The plating layers 22, 32, PL are made of copper. Thus, the conductor layer 21 and the plating layer 22 on the upper surface S1 of the insulating layer 1 are electrically connected to the conductor layer 31 and the plating layer 32 on the lower surface S2 via the plurality of through holes H.

Figure 5D:
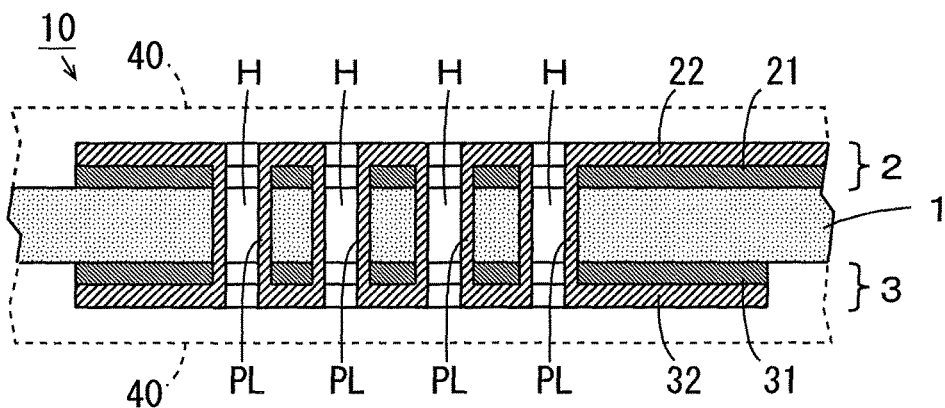

Next, as shown in FIG. 5D, a portion of the conductor layer 21 on which the plating layer 22 is not formed is removed by etching. In this manner, the first wiring trace 2, the first terminal 4 and the second terminal 5 are formed on the upper surface S1 of the insulating layer 1 by an additive method. Further, each portion of the conductor layer 31 on which the plating layer 32 is not formed is removed by etching. In this manner, the second wiring trace 3 is formed on the lower surface S2 of the insulating layer 1 by the additive method. Thus, the coil printed circuit board 10 of FIGS. 2 and 3 is completed.

Also in the present example, as indicated by a dotted line in FIG. 5D, the cover insulating layer 40 may be formed on the upper surface S1 and the lower surface S2 of the insulating layer 1 to cover the first and second wiring traces 2, 3.

(3) Third Manufacturing Example

FIGS. 6A-6E are cross sectional views of steps showing the third manufacturing example of the coil printed circuit board 10 of FIGS. 2A to 3B. The cross sectional views shown in FIGS. 6A-6E are equivalent to the cross sectional view taken along the line A-A of FIG. 3A.

Figure 6A:
FIGS. 6A to 6E are cross sectional views showing steps of a third manufacturing example of the coil printed circuit board of FIGS. 2A to 3B.

First, as shown in FIG. 6A, a single-layer base material made of only the insulating layer 1 is prepared. The insulating layer 1 is made of polyimide.

Figure 6B:
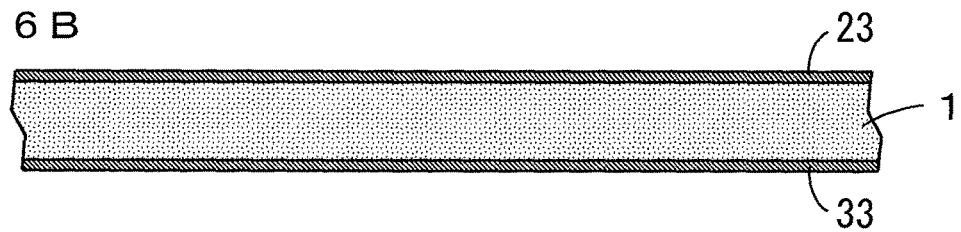

Next, as shown in FIG. 6B, metal thin films 23, 33 are respectively formed on the upper surface S1 and the lower surface S2 of the insulating layer 1 by sputtering. The metal thin films 23, 33 are made of copper. The thickness of each of the metal thin films 23, 33 is smaller than the thickness of each of the conductor layers 20, 30 (FIG. 4A) of the first manufacturing example.

Figure 6C:
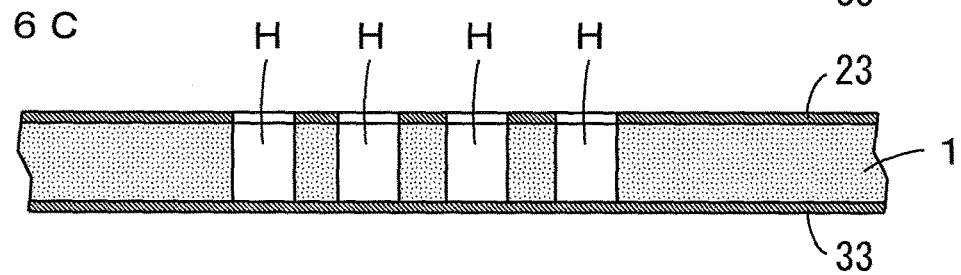

Then, as shown in FIG. 6C, a plurality of through holes H are formed only in the insulating layer 1 and the metal thin film 23 at a predetermined plurality of positions. Each through hole H of the present example is formed by the laser processing.

Figure 6D:
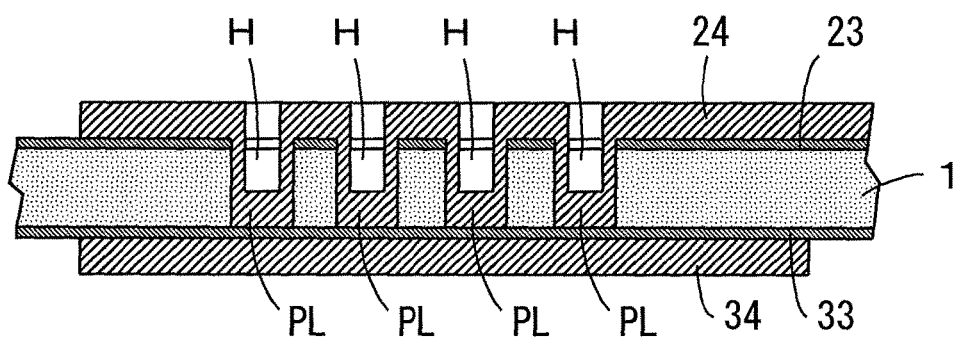

Next, as shown in FIG. 6D, a conductive plating layer 24 having a predetermined pattern is formed on the upper surface of the metal thin film 23, and the conductive plating layer PL is formed on the inner peripheral surface of each through hole H and on the upper surface of the metal thin film 33 exposed in each through hole H. Further, a conductive plating layer 34 having a predetermined pattern is formed on the lower surface of the metal thin film 33.

The plating layers 24, 34, PL are made of copper. As described above, a plurality of blind via holes are formed in a plurality of portions of the insulating layer 1. Thus, the metal thin film 23 and the plating layer 24 on the upper surface S1 of the insulating layer 1 are electrically connected to the metal thin film 33 and the plating layer 34 on the lower surface S2 via the plurality of blind via holes.

Figure 6E:
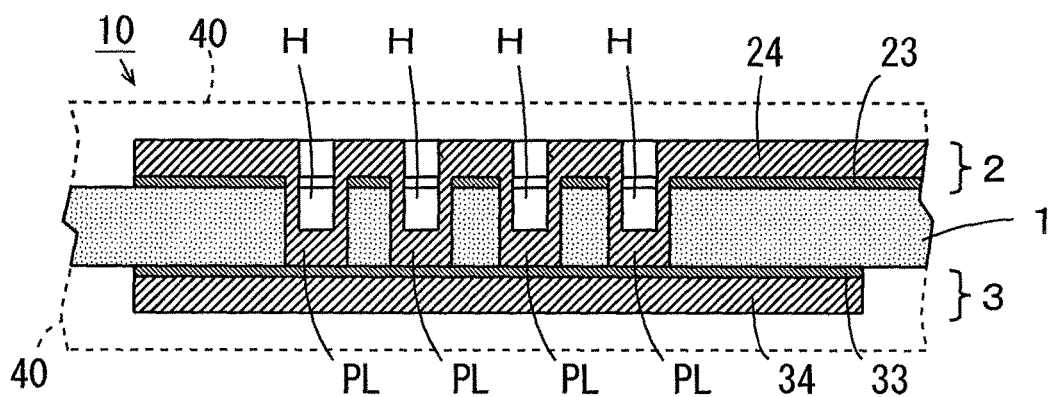

Next, as shown in FIG. 6E, each portion of the metal thin film 23 on which the plating layer 24 is not formed is removed by etching. In this manner, the first wiring trace 2, the first terminal 4 and the second terminal 5 are formed on the upper surface S1 of the insulating layer 1 by the additive method. Further, each portion of the metal thin film 33 on which the plating layer 34 is not formed is removed by etching. In this manner, the second wiring trace 3 is formed on the lower surface S2 of the insulating layer 1 by the additive method. Thus, the coil printed circuit board 10 of FIGS. 2 and 3 is completed.

Also in the present example, as indicated by a dotted line in FIG. 6E, the cover insulating layer 40 may be formed on the upper surface S1 and the lower surface S2 of the insulating layer 1 to cover the first and second wiring traces 2, 3.

(4) Modified Examples

As a material for the insulating layer 1, another insulating material such as polyamide imide, polyethylene terephthalate, polyethylenenaphthalate, polyphenylenesulfide, liquid crystal polymer, polyolefin, epoxy, polytetrafluoroethylene or the like may be used instead of polyimide.

As a material for each of the conductor layers 20, 21, 30, 31, the plating layers 22, 24, 32, 34 and the metal thin films 23, 33, another metal such as gold, silver, nickel, or aluminum may be used and an alloy such as a copper alloy and an aluminum alloy may be used instead of copper.

In the above-mentioned first to third manufacturing examples, nickel plating and gold plating may be performed on the surface of each of the first terminal 4 and the second terminal 5.

[4] Frequency Dependency Test of Resistance Component

As shown in FIGS. 1A and 1B, in the coil printed circuit board 10 according to the present embodiment, the first coil portion 2A and the second coil portion 3A are electrically connected in parallel to each other except for a portion parted in each intersection region CA.

In this case, a combined resistance value of whole of the first and second coil portions 2A, 3A is smaller than a resistance value of each of the first and second coil portions 2A, 3A. Therefore, even when the resistance value of each of the first and second coil portions 2A, 3A increases due to the proximity effect, the combined resistance value of whole of the first and second coil portions 2A, 3A does not increase. Therefore, an increase in resistance component is inhibited over a large frequency band.

In order to confirm the above-mentioned effect, the inventors of the present application performed the frequency dependency test of the resistance component shown below. First, the inventors of the present application fabricated a sample s1 having the same configuration as the coil printed circuit board 10 of FIGS. 2A-2B. Further, the inventors of the present application formed a second coil portion 3A at each of an upper surface S1 and a lower surface S2 of an insulating layer 1 and fabricated a coil printed circuit board of a sample s2 by connecting the two second coil portions 3A in series to each other.

Each sample s1, s2 is designed to have an inductance of about 17 µH to 18 pH. Further, each sample s1, s2 is designed to have a resistance value of about 0.63Ω with a DC flowing. In the sample s1, a maximum outer diameter D1 is 40 mm and a minimum inner diameter D2 is 12 mm for each of the first and second coil portions 2A, 3A. Also in the sample s2, a maximum outer diameter D1 is 40 mm and a minimum inner diameter D2 is 12 mm for the two second coil portions 3A.

Regarding the sample s1, an AC having a plurality of types of frequencies and predetermined amplitude flowed between the first terminal 4 and the second terminal 5, and a combined resistance value of the first and second coil portions 2A, 3A at each frequency was measured by a power wirewound resistor. Similarly, regarding the sample s2, an AC having a plurality of types of frequencies and predetermined amplitude flowed in the two second coil portions 3A connected in series, and a combined resistance value of the two second coil portions 3A at each frequency was measured by the power wirewound resistor.

Figure 7:
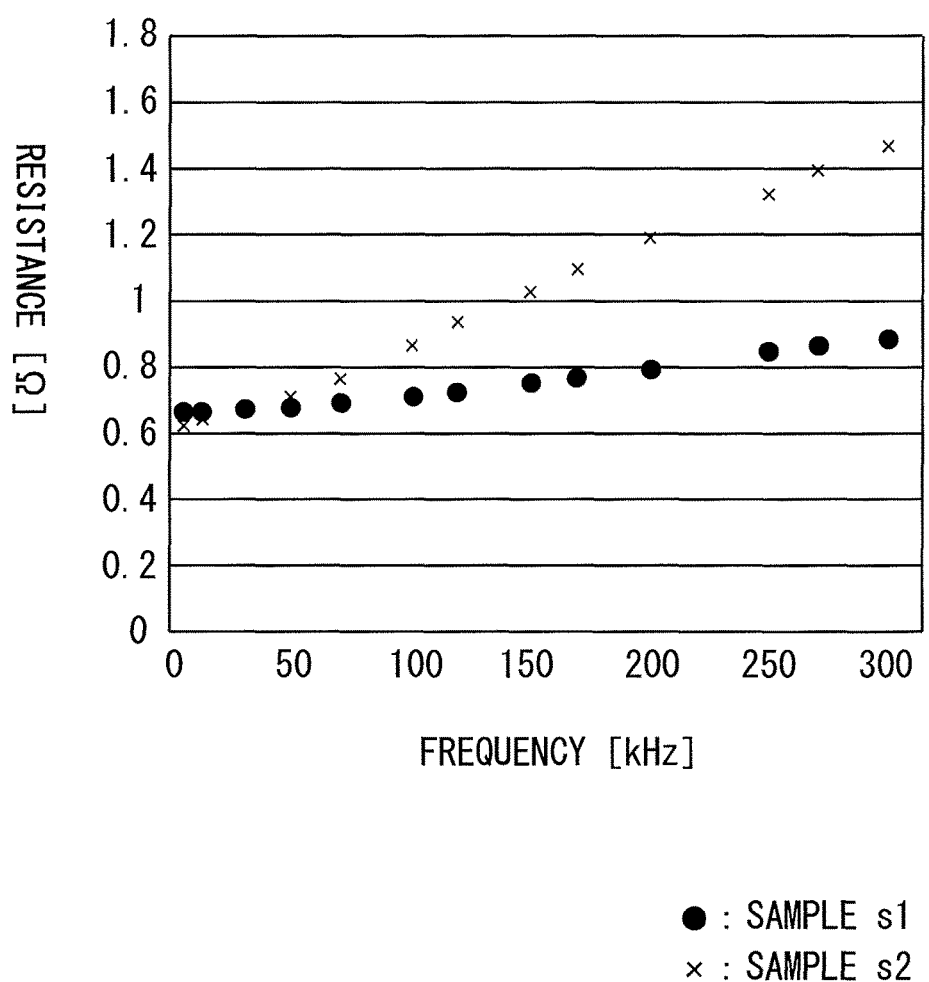
FIG. 7 is a graph showing results of a frequency dependency test of a resistance component.

FIG. 7 is a graph showing a result of the frequency dependency test of the resistance component. In the graph of FIG. 7, the ordinate indicates the resistance, and the abscissa indicates the frequency of the AC. Further, "•" indicates a test result of the sample s1, and "x" indicates a test result of the sample s2.

As shown in FIG. 7, the combined resistance value of the sample s1 increases from 0.65Ω to 0.9Ω as the frequency increases from 0 kHz to 300 kHz. On the one hand, the combined resistance value of the sample s2 increases from 0.63Ω to 1.45Ω as the frequency increases from 0 kHz to 300 kHz. In this manner, while the combined resistance value of the sample S2 is substantially equal to the combined resistance value of the sample s1 as the frequency increases from 0 kHz to 50 kHz, the combined resistance value of the sample s2 increases to be markedly larger than the combined resistance value of the sample s1 as the frequency increases from 50 kHz to 300 kHz.

Thus, it was confirmed that the combined resistance value of the sample s1 was maintained lower than the combined resistance value of the sample s2 even in the high frequency band. Therefore, it is found that the coil printed circuit board 10 according to the present embodiment causes an increase in resistance component to be inhibited over a wide frequency band.

[5] Frequency Dependency Test of Coil Temperature

The coil printed circuit board 10 according to the present embodiment causes an increase in resistance component to be inhibited over a wide frequency band, so that an amount of heat generation in the first coil portion 2A and the second coil portion 3A can be inhibited in a wide frequency band.

In order to confirm the above-mentioned effect, the inventors of the present invention performed the frequency dependency test of the coil temperature shown below. First, the inventors of the present invention fabricated five samples s11 to s15 that have the same configuration as the above-mentioned sample s1 and have different thicknesses of each of the first and second coil portions 2A, 3A from one another. Further, the inventors of the present invention fabricated five samples s21 to s25 that have the same configuration as the above-mentioned sample s2 and have different thicknesses of the second coil portions 3A from one another.

The thicknesses of each of the first and second coil portions 2A, 3A of the five samples s11, s12, s13, s14, s15 are 35 µm, 50 µm, 65 µm, 80 µm and 100 µm, respectively. The thicknesses of each second coil portion 3A of the five samples s21, s22, s23, s24, s25 are 35 µm, 50 µm, 65 µm, 80 µm and 100 µm, respectively.

Each sample s11 to s15, s21 to s25 is designed to have an inductance of about 17 µH to 18 pH. In each sample s11 to s15, a maximum outer diameter D1 is 40 mm and a minimum inner diameter D2 is 12 mm for each of the first and second coil portions 2A, 3A. Also in each sample s21 to s25, a maximum outer diameter D1 is 40 mm and a minimum inner diameter D2 is 12 mm for each of the two second coil portions 3A.

Regarding each sample s11 to s15, an AC having a plurality of types of frequencies and predetermined amplitude flowed between the first terminal 4 and the second terminal 5, and a surface temperature of the first coil portion 2A was measured as the coil temperature. Similarly, regarding each sample s21 to s25, an AC having a plurality of types of frequencies and predetermined amplitude flowed in the two second coil portions 3A connected in series, and a surface temperature of the one second coil portion 3A was measured as the coil temperature. An ambient temperature of each of samples s11 to s15, s21 to s25 during the test was 24° C.

Figure 8A:
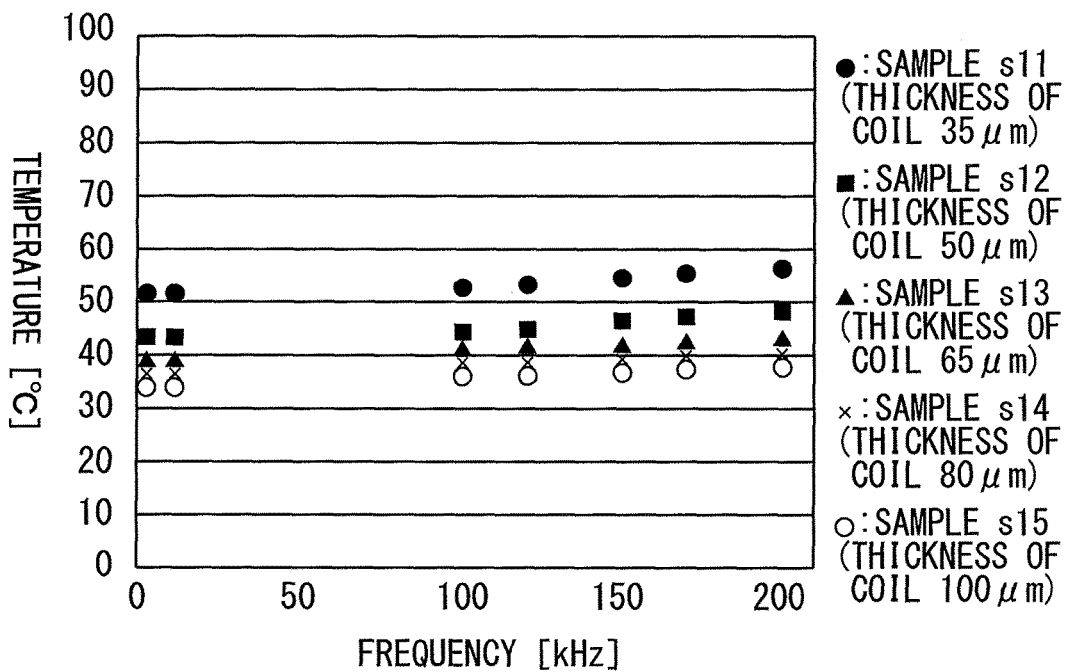
FIGS. 8A and 8B are graphs showing results of the frequency dependency tests of coil temperature.
Figure 8B:
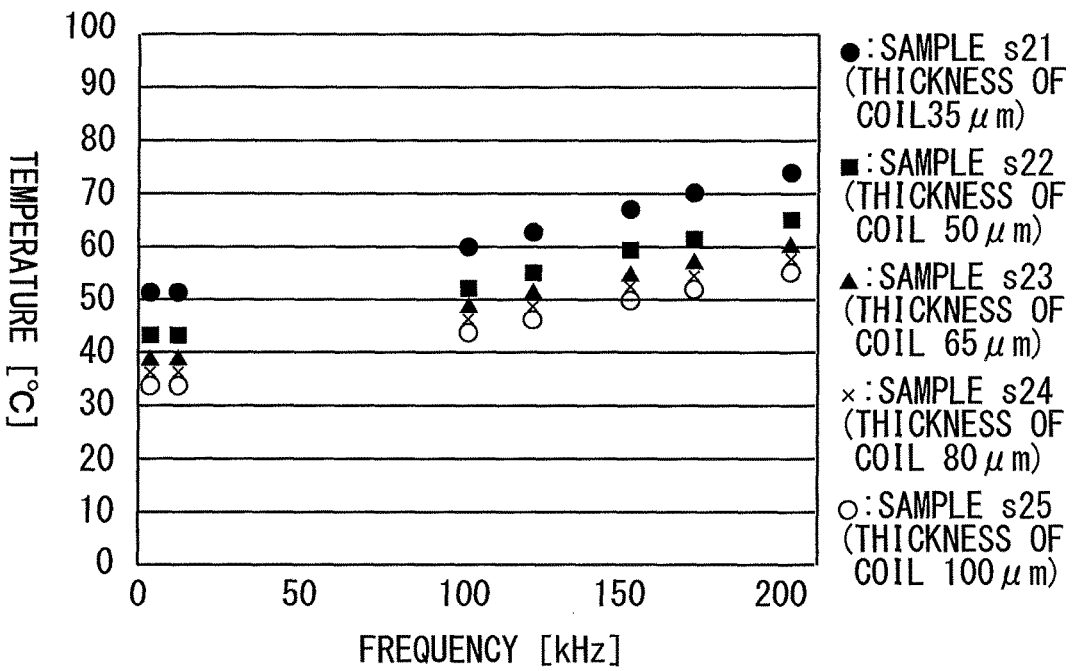

FIGS. 8A-8B are graphs showing the results of the frequency dependency tests of the coil temperature. The test results of the samples s11 to s15 are shown in FIG. 8A, and the test results of the samples s21 to s25 are shown in FIG. 8B.

In the graph of FIG. 8A, the ordinate indicates the coil temperature, and the abscissa indicates the frequency of the AC. "." indicates a test result of the sample s11, and "■" indicates a test result of the sample s12. "▲" indicates a test result of the sample s13, "x" indicates a test result of the sample s14, and "○" indicates a test result of the sample s15.

As shown in FIG. 8A, the coil temperature of the sample s11 increases from 50° C. to 58° C. as the frequency increases from 0 kHz to 200 kHz. The coil temperature of the sample s12 increases from 43° C. to 49° C. as the frequency increases 0 kHz to 200 kHz. The coil temperature of the sample s13 increases from 39° C. to 42° C. as the frequency increases from 0 kHz to 200 kHz. The coil temperature of the sample s14 increases from 36° C. to 40° C. as the frequency increases from 0 kHz to 200 kHz. The coil temperature of the sample s15 increases from 34° C. to 38° C. as the frequency increases from 0 kHz to 200 kHz. The rates of change of the coil temperatures of the samples s11 to s15 are substantially equal to one another as the frequency increases from 0 kHz to 200 kHz.

From these, regarding the samples s11 to s15, it was confirmed that the larger the thickness of each of the first coil portion 2A and the second coil portion 3A is, the lower the coil temperature is regardless of the frequency.

In the graph of FIG. 8B, the ordinate indicates the coil temperature, and the abscissa indicates the frequency of the AC. "•" indicates a test result of the sample s21, and "■" indicates a test result of the sample s22. "▲" indicates a test result of the sample s23, "x" indicates a test result of the sample s24, and "○" indicates a test result of the sample s25.

As shown in FIG. 8B, the coil temperature of the sample s21 increases from 51° C. to 74° C. as the frequency increases from 0 kHz to 200 kHz. The coil temperature of the sample s22 increases from 43° C. to 65° C. as the frequency increases from 0 kHz to 200 kHz. The coil temperature of the sample s23 increases from 39° C. to 60° C. as the frequency increases from 0 kHz to 200 kHz. The coil temperature of the sample s24 increases from 36° C. to 58° C. as the frequency increases from 0 kHz to 200 kHz. The coil temperature of the sample s25 increases from 34° C. to 55° C. as the frequency increases from 0 kHz to 200 kHz. The rates of change of the coil temperatures of the samples s21 to s25 are substantially equal to one another as the frequency increases from 0 kHz to 200 kHz.

From these, also regarding the samples s21 to s25, it was confirmed that the larger the thickness of the second coil portion 3A is, the lower the coil temperature is regardless of the frequency.

When the graphs of FIGS. 8A and 8B are compared to each other, the coil temperature of the sample s21 increases to be markedly larger than the coil temperature of the sample s11 having the same thickness of the second coil portion 3A as the frequency increases. Similarly, the coil temperature of each sample s22 to s25 also increases to be markedly larger than the coil temperature of each sample s12 to s15 having the same thickness of the second coil portion 3A as the frequency increases.

Thus, it was confirmed that the coil temperature of each sample s11 to s15 is maintained lower than the coil temperature of each sample s22 to s25 also in a high frequency band. Therefore, it is found that the coil printed circuit board 10 according to the present embodiment causes an amount of heat generation of each of the first coil portion 2A and the second coil portion 3A to be inhibited over a wide frequency band.

[6] Effects

As described above, in the coil printed circuit board 10 according to the present embodiment, the first coil portion 2A and the second coil portion 3A are electrically connected in parallel to each other except for each portion parted in each intersection region CA on the upper surface S1 of the insulating layer 1. Thus, an increase in resistance component is inhibited over a wide frequency band.

Further, the first terminal 4 and the second terminal 5 are formed at a position outside of the first coil region A1 on the upper surface S1 of the insulating layer 1. The outer end P1 of the first coil portion 2A and the first terminal 4 are connected to each other by the first lead portion 2B, and the inner end P2 of the first coil portion 2A and the second terminal 5 are connected to each other by the second lead portion 2C. In this case, it is not necessary to lead the inner end P2 of the first coil portion 2A to outside of the first coil portion 2A using the connection member such as the jumper wire. Thus, a connection work between the first coil portion 2A and another electronic device is facilitated.

As a result, an increase in resistance component is inhibited over a wide frequency band, and the connection work to another electronic device is facilitated.

When the coil printed circuit board 10 is manufactured, each through hole H that connects between the outer ends P1, P3, each through hole H that connects between the inner ends P2, P4, and each through hole H that connects the one and other portions of the first coil portion 2A parted in each intersection region CA to the second coil portion 3A are formed in the common step. Thus, the number of components and the number of steps of manufacturing the coil printed circuit board 10 can be decreased.

As described above, the first wiring trace 2, the first terminal 4 and the second terminal 5 are formed on the upper surface S1 of the insulating layer 1. Therefore, the first wiring trace 2, the first terminal 4 and the second terminal 5 are formed in the common step. Thus, the number of steps of manufacturing the coil printed circuit board 10 can be decreased. Further, an operator can connect another electronic device to the first terminal 4 and the second terminal 5 without reversing the insulating layer 1 while facing the upper surface S1 of the insulating layer 1. Therefore, the connection work is facilitated.

Figure 9:
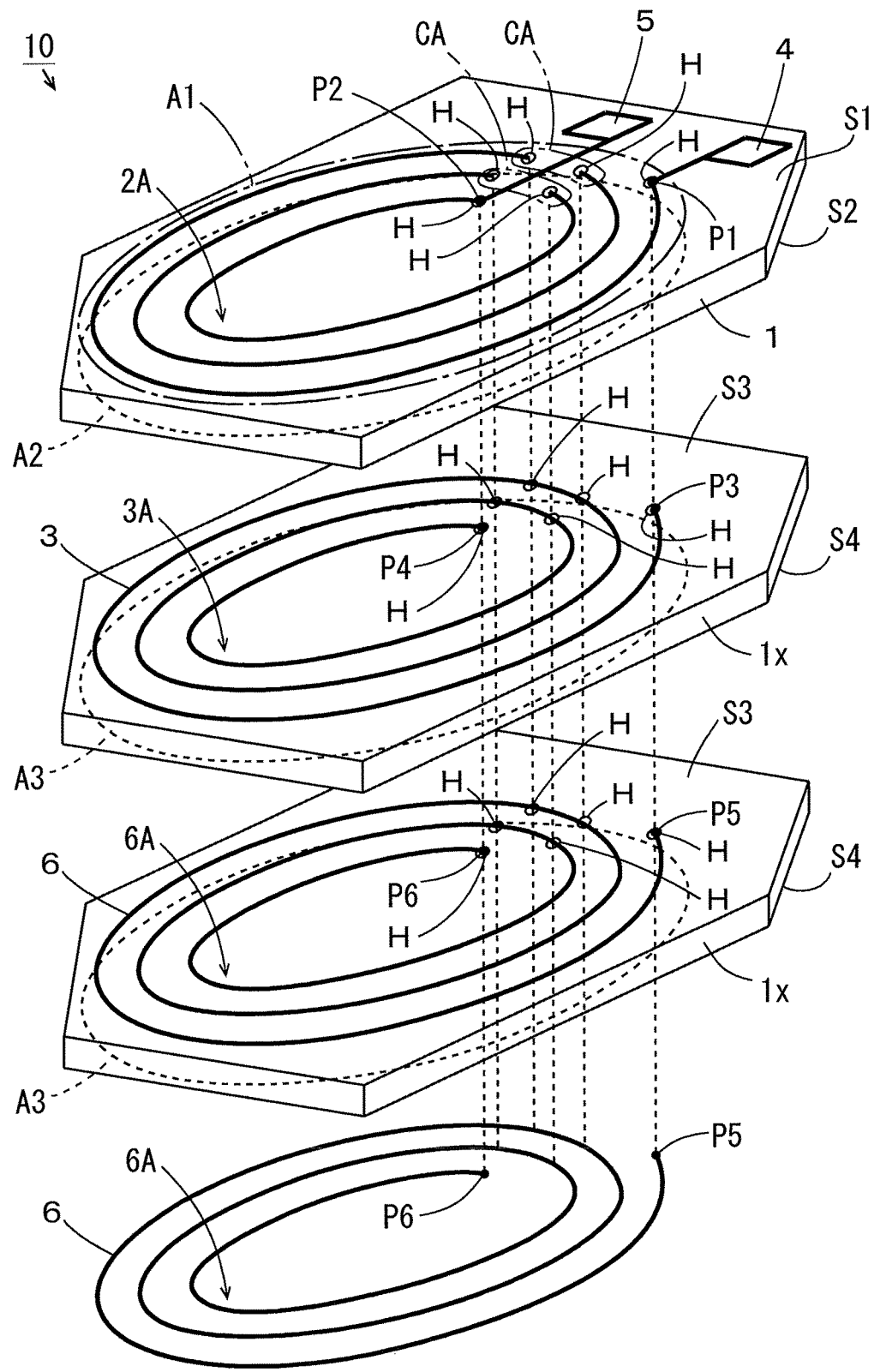
FIG. 9 is a diagram for explaining another example of a configuration of the coil printed circuit board.

[7] Another Example of Configuration of Coil Printed Circuit Board (1) Coil Printed Circuit Board Having Multi-Layer Structure Regarding another example of the configuration of the coil printed circuit board 10, differences from the coil printed circuit board 10 of FIGS. 1 to 3 will be described. FIG. 9 is a diagram for explaining another example of the configuration of the coil printed circuit board 10. In FIG. 9, an exploded perspective view of the coil printed circuit board 10 of another example of the configuration is schematically shown.

As shown in FIG. 9, the coil printed circuit board 10 of the present example includes one or plurality (two in the present example) of insulating layers 1x in addition to the configuration of the coil printed circuit board 10 of FIGS. 1A-1B. Each insulating layer 1x has an upper surface S3 and a lower surface S4 that are opposite to each other.

Each insulating layer 1x is laminated on the lower surface S2 of the insulating layer 1 such that the upper surface S3 is closer to the lower surface S2 of the insulating layer 1 than the lower surface S4. A third wiring trace 6 is formed on the lower surface S4 of each insulating layer 1x. In FIG. 9, the second wiring trace 3 is shown at a position spaced apart from the insulating layer 1 to facilitate understanding of the shape of each of the second wiring trace 3 and the two third wiring traces 6. Further, the third wiring trace 6 is shown at a position spaced apart from each insulating layer 1x.

A third coil region A3 having a predetermined shape is set on the lower surface S4 of each insulating layer 1x. At least part of the first coil region A1 and at least part of the third coil region A3 overlap with each other. In the present example, the first, second and third coil regions A1, A2, A3 have the same circular shape, and each of the entire first, second and third coil regions A1, A2, A3 overlaps with one another.

The third wiring trace 6 includes a third coil portion 6A. The third coil portion 6A has the same shape as the second coil portion 3A. The third coil portion 6A is continuously spirally formed on the third coil region A3.

In each insulating layer 1x, a through hole H is formed in a portion overlapping with each through hole H formed in the insulating layer 1. Plating is respectively performed on the inner peripheral surfaces of the plurality of through holes H formed in each insulating layer 1x. Alternatively, a conductive material is filled inside of these plurality of through holes H.

Thus, the outer end P1 of the first coil portion 2A is electrically connected to an outer end P5 of the third coil portion 6A via each through hole H formed in each of the insulating layers 1, 1x. Further, the inner end P2 of the first coil portion 2A is electrically connected to an inner end P6 of the third coil portion 6A via each through hole H formed in each of the insulating layers 1, 1x. Further, the one and other portions of the first coil portion 2A parted in each intersection region CA are electrically connected to the third coil portion 6A via each through hole H formed in each of the insulating layers 1, 1x.

In the coil printed circuit board 10 of FIG. 9 having the above-mentioned configuration, the third coil portion 6A of each insulating layer 1x, the first coil portion 2A and the second coil portion 3A are electrically connected in parallel to one another except for each portion parted in each intersection region CA on the upper surface S1 of the insulating layer 1.

In this case, a combined resistance value of whole of each third coil portion 6A and the first and second coil portions 2A, 3A is sufficiently smaller than the resistance value of each third coil portion 6A and each of the first and second coil portions 2A, 3A. Therefore, even when the resistance value of each third coil portion 6A and each of the first and second coil potions 2A, 3A increases due to the proximity effect, the combined resistance value of the whole of each third coil portion 6A and the first and second coil portions 2A, 3A does not increase. Therefore, an increase in resistant component is sufficiently inhibited over a wide frequency band.

Also in the present example, it is not necessary to extend the inner end P2 of the first coil portion 2A to outside of the first coil portion 2A using the connection member such as the jumper wire. Thus, a connection work between the first coil portion 2A and another electronic device is facilitated.

(2) Coil Printed Circuit Board in which Slit is Formed in Coil Portion

Regarding yet another example of the configuration of the coil printed circuit board 10, differences from the coil printed circuit board 10 of FIGS. 1 to 3 will be described. FIG. 10 is a diagram for explaining yet another example of the configuration of the coil printed circuit board 10. In FIG. 10, a partially enlarged plan view of the coil printed circuit board 10 of yet another example of the configuration is shown.

As shown in FIG. 10, in the present example, each slit SL extending in the circumferential direction is formed in a remaining portion of the first coil portion 2A except for each portion overlapping with each intersection region CA, the outer end P1 and the inner end P2. Each slit SL is formed along the center of the first coil portion 2A in a width direction. A width w5 of each slit SL is not less than 30 μm and not more than 1000 μm, for example, is preferably not less than 50 μm and not more than 500 μm, and is more preferably not less than 50 μm and not more than 300 μm. Further, each slit SL is preferably designed such that the width of each parted line portion is smaller than twice of a value of a surface skin depth at a frequency of an AC flowing in the first and second coil portions 2A, 3A.

Although they are not shown in FIG. 10, each slit SL extending in the circumferential direction is formed in a remaining portion of the second coil portion 3A except for each portion overlapping with each intersection region CA, the outer end P3 and the inner end P4.

In this case, in a line portion, of the first and second coil portions 2A, 3A, in which each slit SL is formed, a cross section orthogonal to the circumferential direction is parted by the slit SL. Thus, the width of each parted line portion decreases, so that a resistance value of each parted line portion is unlikely to be influenced by the skin effect. Therefore, an increase in resistance component due to the skin effect is inhibited even when the frequency increases.

(3) Coil Printed Circuit Board Including Another Coil Portion

As described above, the coil printed circuit board 10 according to the present embodiment is used as a power reception coil of a wireless power supply system, for example. In this case, in the coil printed circuit board 10, the first coil portion 2A and the second coil portion 3A function as the power reception coil.

One or plurality of reception coil portions that receive a signal sent by wireless communication may be formed on at least one surface of the upper surface S1 and the lower surface S2 of the insulating layer 1 of the coil printed circuit board 10.

Figure 11:
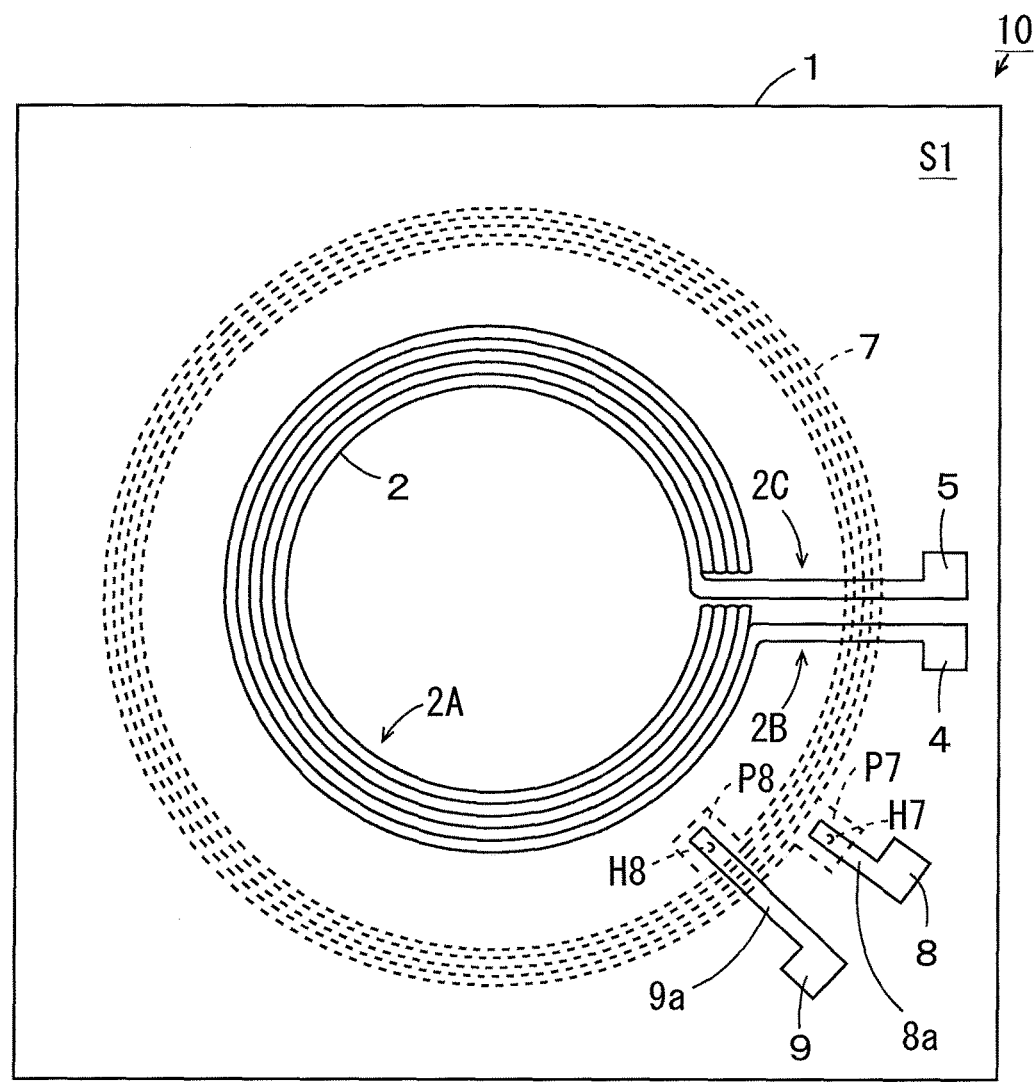
FIG. 11 is a plan view of the coil printed circuit board including a reception coil portion as viewed from above.
Figure 12:
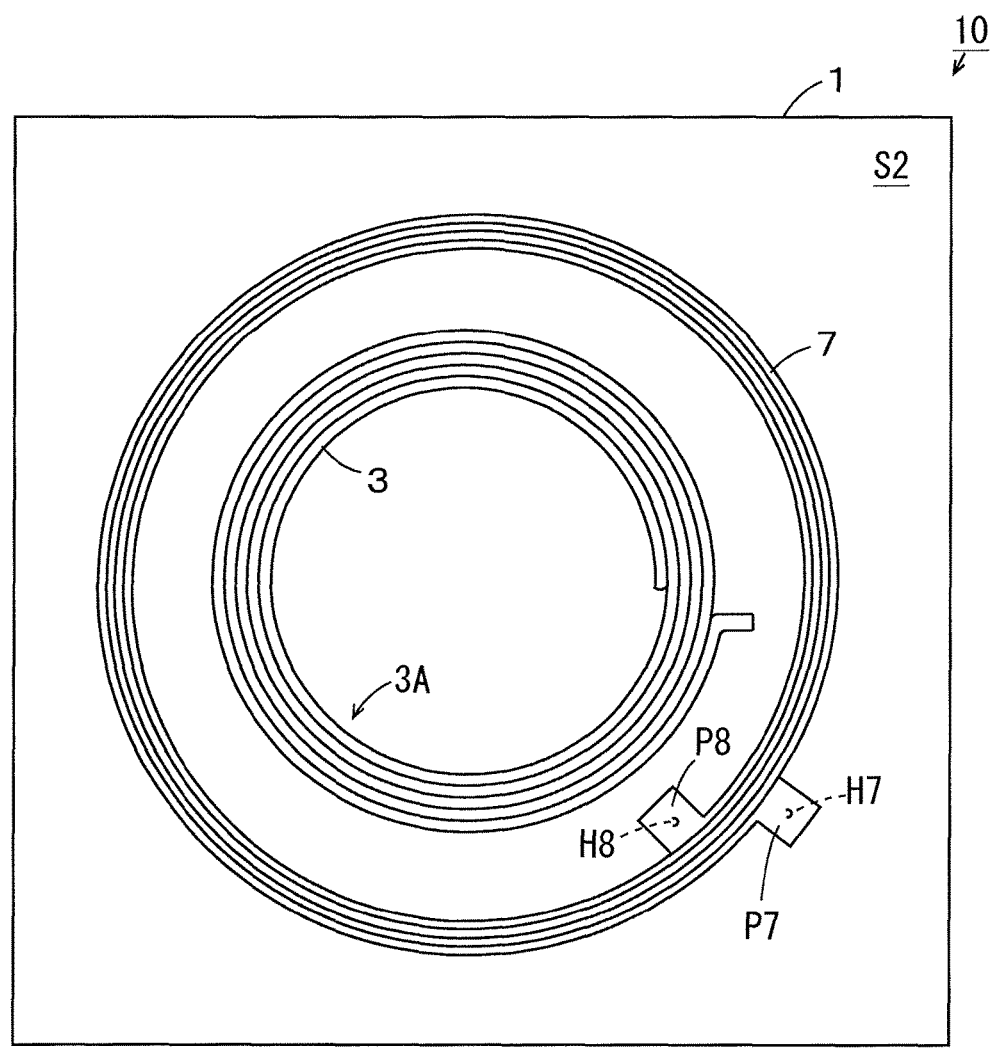
FIG. 12 is a plan view of the coil printed circuit board including the reception coil portion as viewed from below.

FIG. 11 is a plan view of the coil printed circuit board 10 including the reception coil portion as viewed from above, and FIG. 12 is a plan view of the coil printed circuit board 10 including the reception coil portion as viewed from below.

As shown in FIG. 12, in the present example, the reception coil portion 7 is spirally formed to surround the second coil portion 3A on the lower surface S2 of the insulating layer 1. In the insulating layer 1, through holes H7, H8 are respectively formed in portions respectively overlapping with an outer end P7 and an inner end P8 of the reception coil portion 7.

As shown in FIG. 11, a third lead portion 8a, a fourth lead portion 9a, a third terminal 8 and a fourth terminal 9 are formed on the upper surface S1 of the insulating layer 1. The third lead portion 8a is formed to extend from a region in which the through hole H7 is formed to the third terminal 8. Further, the fourth lead portion 9a is formed to extend from a region in which the through hole H8 is formed to the fourth terminal 9.

Plating is respectively performed on the inner surfaces of the through holes H7, H8. Alternatively, a conductive material is filled inside of the plurality of through holes H7, H8. Thus, the third terminal 8 is electrically connected to the outer end P7 of the reception coil portion 7 on the lower surface S2 via the third lead portion 8a and the through hole H7. The fourth terminal 9 is electrically connected to the inner end P8 of the reception coil portion 7 on the lower surface S2 via the fourth lead portion 9a and the through hole H8.

The coil printed circuit board 10 of the present example causes the power sent by electromagnetic induction or magnetic resonance to be received by the first and second coil portions 2A, 3A, and causes a signal sent by the wireless communication to be received by the reception coil portion 7.

Further, in the coil printed circuit board 10 of the present example, the third lead portion 8a, the fourth lead portion 9a, the third terminal 8 and the fourth terminal 9 can be simultaneously formed on the upper surface S1 of the insulating layer 1 in a formation process of the first wiring trace 2. Further, in a formation process of the second wiring trace 3, the reception coil portion 7 can be simultaneously formed on the lower surface S2 of the insulating layer 1. Therefore, it is not necessary to individually form the reception coil portion 7, the third lead portion 8a, the fourth lead portion 9a, the third terminal 8 and the fourth terminal 9. Thus, an increase in number of steps of manufacturing the coil printed circuit board 10 is inhibited.

Figure 13:
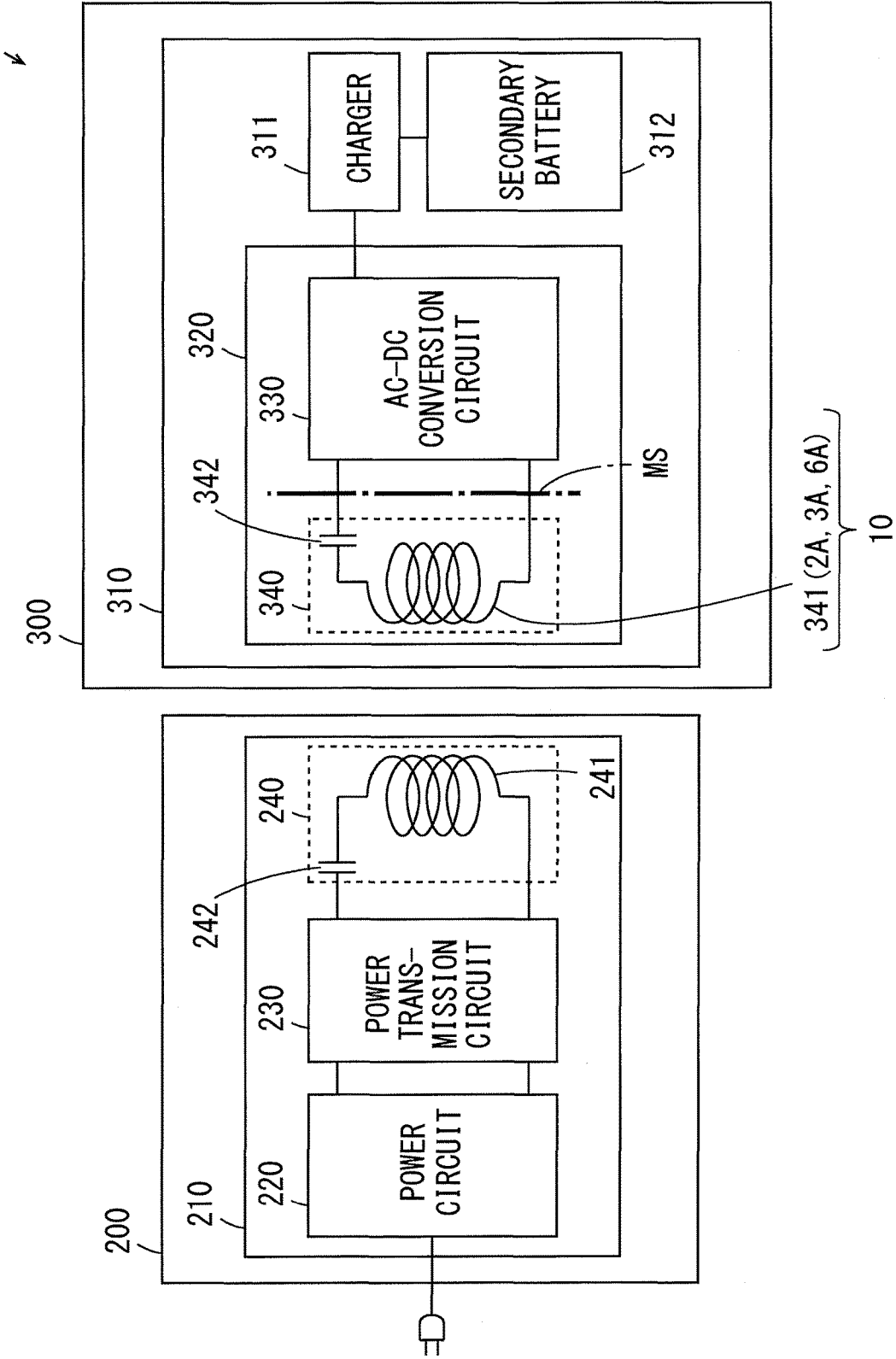
FIG. 13 is a block diagram showing a first example of a wireless power supply system using the coil printed circuit board.

[8] Wireless Power Supply System (1) First Example of Wireless Power Supply System FIG. 13 is a block diagram showing the first example of the wireless power supply system using the coil printed circuit board 10. The wireless power supply system 100 of FIG. 13 includes a power transmission device 200 and a terminal 300. The terminal 300 is a mobile device such as a cellular telephone.

The power transmission device 200 includes a power transmission module 210. The power transmission module 210 includes a power circuit 220, a power transmission circuit 230 and a resonance circuit 240. The resonance circuit 240 is connected to the power transmission circuit 230 and has a configuration in which the power transmission coil 241 and the resonance capacitor 242 are connected in series to each other.

The terminal 300 includes a battery unit 310. The battery unit 310 includes a charger 311, a secondary battery 312 and a power reception module 320. The power reception module 320 includes an alternating current-direct current conversion circuit (hereinafter referred to as an AC-DC conversion circuit) 330 and a resonance circuit 340. The resonance circuit 340 is connected to the AC/DC conversion circuit 330 and has a configuration in which a power reception coil 341 and a resonance circuit 342 are connected in series to each other. Any coil printed circuit board 10 of FIGS. 1A to 3B, FIG. 9 and FIG. 10 is provided in the power reception module 320. In this case, the first, second and third coil portions 2A, 3A, 6A of any coil printed circuit board 10 of FIGS. 1 to 3, FIGS. 9 and 10 are used as the power reception coil 341.

In the power transmission device 200, the power circuit 220 is connected to a commercial power supply. Thus, AC power is supplied from the power circuit 220 to the power transmission circuit 230. The resonance circuit 240 resonates at a predetermined frequency. Thus, the AC power is sent from the power transmission coil 241 of the resonance circuit 240 to the terminal 300 by the magnetic resonance.

In the terminal 300, the power reception coil 341 of the resonance circuit 340 receives the AC power sent from the power transmission coil 241. Specifically, the first coil portion 2A and the second coil portion 3A of the coil printed circuit board 10 receives the AC power sent from the power transmission coil 241. The AC power is supplied from the resonance circuit 340 to the AC-DC conversion circuit 330. The AC-DC conversion circuit 330 converts the supplied AC power to DC power and supplies it to the charger 311. The charger 311 charges the secondary battery 312 with the supplied DC power.

In the power reception module 320 of the present example, the first, second and third coil portions 2A, 3A, 6A of any coil printed circuit board 10 of FIGS. 1 to 3, 9 and 10 are used as the power reception coil 341. Therefore, the power reception module 320 that can be operated with a low power loss in a wide frequency band can be easily fabricated at a low cost. Further, the battery unit 310 that can be operated with a low power loss in a wide frequency band can be easily fabricated at a low cost.

In the power reception module 320 of FIG. 13, a magnetic shield member MS is preferably provided to be laminated on the power reception coil 341 (any coil printed circuit board 10 of FIGS. 1 to 3, 9 and 10 in the present example). In this case, an occurrence of an eddy current in the metal member provided in the vicinity of the power reception coil 341 due to a magnetic field that occurs in the power reception coil 341 is prevented. Thus, a decrease in power transmission efficiency due to an occurrence of the eddy current is prevented.

(2) Second Example of Wireless Power Supply System

Figure 14:
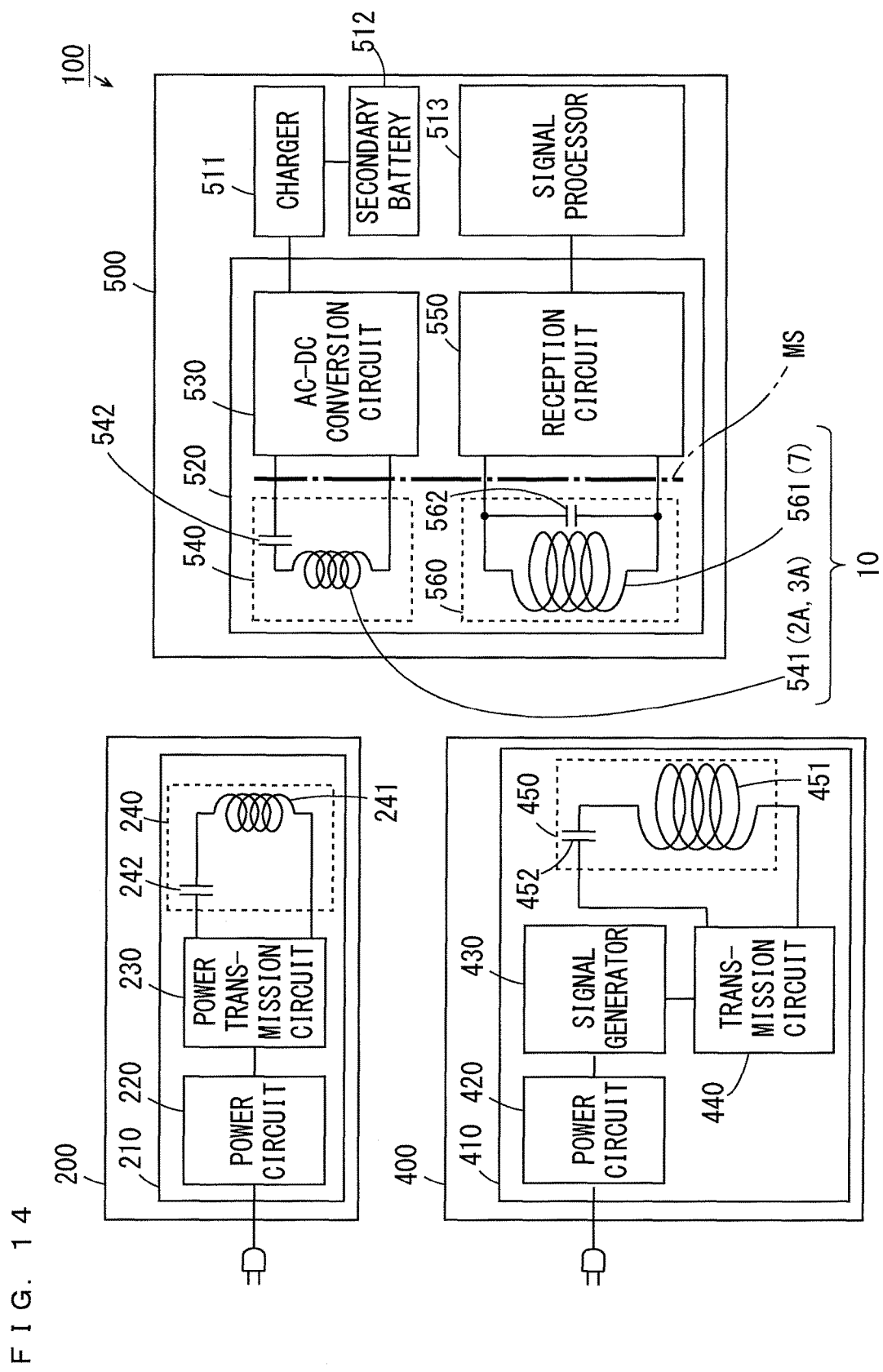
FIG. 14 is a block diagram showing a second example of the wireless power supply system using the coil printed circuit board.

FIG. 14 is a block diagram showing the second example of the wireless power supply system using the coil printed circuit board 10. The wireless power supply system 100 of FIG. 14 includes a power transmission device 200, a transmission device 400 and a terminal 500. The terminal 500 is a mobile device such as a cellular telephone.

The power transmission device 200 of the present example has the same configuration as the power transmission device 200 of FIG. 13. The power transmission device 400 includes a transmission module 410. The transmission module 410 includes a power circuit 420, a signal generator 430, a transmission circuit 440 and a resonance circuit 450. The resonance circuit 450 is connected to the transmission circuit 440 and has a configuration in which a transmission coil 451 and a resonance capacitor 452 are connected in series to each other.

The terminal 500 includes a charger 511, a secondary battery 512, a signal processor 513 and a power reception communication module 520. The power reception communication module 520 includes an AC-DC conversion circuit 530, a power reception resonance circuit 540, a reception circuit 550 and a reception resonance circuit 560. The power reception resonance circuit 540 is connected to the AC-DC conversion circuit 530 and has a configuration in which a power reception coil 541 and a resonance capacitor 542 are connected in series to each other. The reception resonance circuit 560 is connected to the reception circuit 550 and has a configuration in which a reception coil 561 and a resonance capacitor 562 are connected in parallel to each other. The coil printed circuit board 10 of FIGS. 11 and 12 is provided in the power reception communication module 520. In this case, the first and second coil portions 2A, 3A of the coil printed circuit board 10 of FIGS. 11 and 12 are used as the power reception coil 541. Further, the reception coil portion 7 of the coil printed circuit board 10 of FIGS. 11 and 12 is used as the reception coil 561.

In the power transmission device 200, similarly to the example of FIG. 13, the AC power is sent from the power transmission coil 241 of the resonance circuit 240 to the terminal 500 by the magnetic resonance.

In the terminal 500, the power reception coil 541 of the power reception resonance circuit 540 receives the AC power sent from the power transmission coil 241. The AC power is supplied from the power reception resonance circuit 540 to the AC-DC conversion circuit 530. The AC-DC conversion circuit 530 converts the supplied AC power to the DC power and supplies it to the charger 511. The charger 511 charges the secondary battery 512 with the supplied DC power.

In the transmission device 400, the power circuit 420 is connected to a commercial power supply. Thus, the AC power is supplied from the power circuit 420 to the signal generator 430. The signal generator 430 generates a predetermined signal using the supplied AC power and supplies the generated signal to the transmission circuit 440. The resonance circuit 450 resonates at a predetermined frequency. Thus, a modulation wave including a predetermined signal is sent by the electromagnetic induction from the transmission coil 451 of the resonance circuit 450 to the terminal 500.

In the terminal 500, the reception coil 561 of the reception resonance circuit 560 receives the modulation wave sent from the transmission coil 451. Specifically, the reception coil portion 7 of the coil printed circuit board 10 of FIGS. 11 and 12 receives the modulation wave sent from the transmission coil 451. The modulation wave is supplied from the reception resonance circuit 560 to the reception circuit 550. The reception circuit 550 takes out a predetermined signal from the modulation wave by demodulating the modulation wave and supplies it to the signal processor 513. The signal processor 513 performs a predetermined process on the supplied signal.

In the power reception communication module 520 of the present example, the first and second coil portions 2A, 3A of the coil printed circuit board 10 of FIGS. 11 and 12 are used as the power reception coil 541. Further, the reception coil portion 7 is used as the reception coil 561. Therefore, the power reception transmission module 520 that can be operated with a low power loss in a wide frequency band can be easily fabricated at a low cost.

Further, the power sent by the electromagnetic induction or the magnetic resonance is received by the first and second coil portions 2A, 3A, and a signal sent by the wireless communication is received by the reception coil portion 7. Thus, wireless power reception and wireless reception can be performed with a compact configuration.

In the power reception communication module 520 of FIG. 14, a magnetic shield member MS is preferably provided to be laminated on the power reception coil 541 and the reception coil 561 (the coil printed circuit board 10 of FIGS. 11 and 12 in the present example). In this case, an occurrence of an eddy current in the metal member provided in the vicinity of the power reception coil 541 or the reception coil 561 by a magnetic field generated in the power reception coil 541 or the reception coil 561 is prevented. Thus, a decrease in power transmission efficiency due to an occurrence of the eddy current is prevented.

[9] Other Embodiments (1) In the above-mentioned embodiment, the inner end P2 of the first coil portion 2A and the inner end P4 of the second coil portion 3A are electrically connected to each other via each through hole H. Instead, the inner end P2 of the first coil portion 2A and the inner end P4 of the second coil portion 3A may be electrically connected to each other through the jumper wire. Alternatively, the inner end P2 of the first coil portion 2A and the inner end P4 of the second coil portion 3A may be electrically connected to each other through a wiring trace formed at another printed circuit board.

Similarly, in the above-mentioned embodiment, the outer end P1 of the first coil portion 2A and the outer end P3 of the second coil portion 3A are electrically connected to each other via each through hole H. Instead, the outer end P1 of the first coil portion 2A and the outer end P3 of the second coil portion 3A may be electrically connected to each other through the jumper wire. Alternatively, the outer end P1 of the first coil portion 2A and the outer end P3 of the second coil portion 3A may be electrically connected to each other through a wiring trace formed at another printed circuit board. Alternatively, the outer end P1 of the first coil portion 2A and the outer end P3 of the second coil portion 3A may be electrically connected to each other through another wiring trace formed on the upper surface S1, the lower surface S2 and a side surface of the insulating layer 1.

(2) While the first terminal 4 and the second terminal 5 are formed on the upper surface S1 of the insulating layer 1 in the coil printed circuit board 10 of FIGS. 1 to 3 and FIGS. 10 to 12, the invention is not limited to this. The first terminal 4 and the second terminal 5 may be formed on the lower surface S2 instead of the upper surface S1 of the insulating layer 1. Alternatively, one terminal of the first terminal 4 and the second terminal 5 may be formed on the upper surface S1 of the insulating layer 1, and the other terminal may be formed on the lower surface S2.

While the first terminal 4 and the second terminal 5 are formed on the upper surface S1 of the insulating layer 1 in the coil printed circuit board 10 of FIG. 9, the invention is not limited to this. The first terminal 4 and the second terminal 5 may be formed on the lower surface S4 of the insulating layer 1x provided at a position farthest from the insulating layer 1 instead of the upper surface S1 of the insulating layer 1. Alternatively, one terminal of the first terminal 4 and the second terminal 5 may be formed on the upper surface S1 of the insulating layer 1, and the other terminal may be formed on the lower surface S4 of the insulating layer 1x provided at the position farthest from the insulating layer 1.

(3) While the reception coil portion 7 is formed on the lower surface S2 of the insulating layer 1 in the coil printed circuit board 10 of FIGS. 11 and 12, the invention is not limited to this. The reception coil portion 7 may be formed on the upper surface S1 of the insulating layer 1. Alternatively, the two reception coil portions 7 may be respectively formed on the upper surface S1 and the lower surface S2 of the insulating layer 1.

(4) While the reception coil portion 7 is formed to surround the second coil portion 3A in the coil printed circuit board 10 of FIGS. 11 and 12, the invention is not limited to this. The reception coil portion 7 may be arranged beside the second coil portion 3A instead of surrounding the second coil portion 3A.

(5) The reception coil portion 7 of FIGS. 11 and 12 may be formed on any surface of the one or plurality of surfaces of the insulating layers 1, 1x of the coil printed circuit board 10 having a multi-layer structure of FIG. 9. For example, the reception coil portion 7 of FIGS. 11 and 12 may be formed on the upper surface S1 of the insulating layer 1 of the coil printed circuit board 10 having the multi-layer structure of FIG. 9 or on the lower surface S4 of the insulating layer 1x provided at a position farthest from the insulating layer 1. Further, the reception coil portion 7 may be formed on each of the lower surface S2 of the insulating layer 1 and the lower surface S4 of each insulating layer 1x.

(6) While the AC power is sent to the terminals 300, 500 from the power transmission device 200 by the magnetic resonance in the wireless power supply system 100 of FIGS. 13 and 14, the invention is not limited to this. The AC power may be sent from the power transmission device 200 to the terminals 300, 500 by the electromagnetic induction instead of the magnetic resonance.

(7) In the example of FIG. 14, the reception resonance circuit 560 incorporated in the terminal 500 is constituted by the reception coil 561 and the resonance capacitor 562. Further, the reception coil portion 7 of the coil printed circuit board 10 of FIGS. 11 and 12 is used as the reception coil 561. The reception coil portion 7 of FIGS. 11 and 12 may be designed such that parasitic capacitances generated between the adjacent traces function as the resonance capacitor 562. In this case, it is not necessary to provide the resonance capacitor 562 separately from the reception coil portion 7 in the reception resonance circuit 560. Thus, the number of components can be decreased.

(8) While each slit SL is formed in the remaining portion of the first coil portion 2A except for each portion overlapping with each intersection region CA, the outer end P1 and the inner end P2 in the coil printed circuit board 10 of FIG. 10, the invention is not limited to this. The slit SL may be formed in a predetermined angular range (90° and the like, for example) in the circumferential direction of the first coil portion 2A. Further, the slit SL may be intermittently formed. Further, in at least part of the first coil portion 2A and the second coil portion 3A of the coil printed circuit board 10, the plurality of slits SL may be formed to be arranged in the width direction.

(9) While the first coil portion 2A, the second coil portion 3A, the third coil portion 6A and the reception coil portion 7 have a circular outer shape in the above-mentioned embodiment, the invention is not limited to this. Each of the first coil portion 2A, the second coil portion 3A, the third coil portion 6A and the reception coil portion 7 may have an outer shape other than the circular shape instead of the circular outer shape. For example, each coil portion may have an oval outer shape, a square outer shape or a triangular outer shape.

[10] Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the upper surface S1 of the insulating layer 1 is an example of a first surface, the lower surface S2 of the insulating layer 1 is an example of a second surface, the insulating layer 1 is an example of a first insulating layer, the first coil region A1 is an example of a first region, and the first coil portion 2A is an example of a first coil portion.

Further, the second coil region A2 is an example of a second region, the second coil portion 3A is an example of a second coil portion, the outer end P1 of the first coil portion 2A is an example of an outer end of an first coil portion, the first terminal 4 is an example of a first terminal, and the second terminal 5 is an example of a second terminal.

Further, the inner end P2 of the first coil portion 2A is an example of an inner end of a first coil portion, the one or plurality of intersection regions CA are examples of one or plurality of intersection regions, and the second lead portion 2C is an example of a lead portion.

Further, the one or plurality of through holes H that overlap with the one portion of the first coil portion 2A parted in each intersection region CA are examples of a first through hole, the one or plurality of through holes H that overlap with the other portion of the first coil portion 2A parted in each intersection region CA is an example of a second through hole, and the coil printed circuit board 10 is an example of a coil printed circuit board.

Further, the inner end P4 of the second coil portion 3A is an example of an inner end of a second coil portion, the one or plurality of through holes H that overlap with the inner end P2 of the first coil portion 2A are examples of a third through hole, the outer end P3 of the second coil portion 3A is an example of an outer end of the second coil portion, and the one or plurality of through holes H that overlap with the outer end P1 of the first coil portion 2A are examples of a fourth through hole.

Further, the upper surface S3 of the insulating layer 1x is an example of a third surface, the lower surface S4 of the insulating layer 1x is an example of a fourth surface, the one or plurality of insulating layers 1x are examples of one or plurality of second insulating layers, the third coil region A3 is an example of a third region, the third coil portion 6A is an example of a third coil portion, the one or plurality of through holes H that overlap with the one portion of the first coil portion 2A parted in each intersection region CA in each insulating layer 1x are examples of a fifth through hole, and the one or plurality of through holes H that overlap with the other portion of the first coil portion 2A parted in each intersection region CA in each insulating layer 1x is an example of a sixth through hole.

Further, the slit SL is an example of a slit, the power reception module 320 is an example of a power reception module, the secondary battery 312 is an example of a secondary battery, the charger 311 is an example of a charger, the battery unit 310 is an example of a battery unit, the one or plurality of reception coil portions 7 are examples of one or plurality of reception coil portions, and the power reception communication module 520 is an example of a power reception communication module.

As each of various elements recited in the claims, various other elements having configurations or functions described in the claims can be also used.

INDUSTRIAL APPLICABILITY

The present invention can be effectively utilized for various electric devices, electronic devices or the like.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A coil printed circuit board comprising:
a first insulating layer having a first surface and a second surface that are opposite to each other;
a first coil portion spirally formed in a first region on the first surface of the first insulating layer;
a second coil portion spirally formed in a second region on the second surface of the first insulating layer;
a first terminal formed outside the first region on the first surface or outside the second region on the second surface and is electrically connected to an outer end of the first coil portion; and
a second terminal formed outside the first region on the first surface or outside the second region on the second surface, wherein
the first coil portion and the second coil portion are electrically connected in parallel to each other,
one or more intersection regions are provided in which a path, extending from an inner end of the first coil portion to a location outside the first region, intersects with the first coil portion on the first surface,
the first coil portion is parted in each intersection region,
a lead portion is formed on the first surface to extend from the inner end of the first coil portion to the location outside the first region on the path,
the lead portion is arranged to pass between one portion and another portion of the first coil portion parted in each intersection region,
the second terminal is electrically connected to the lead portion outside the first region,
the first insulating layer has a first through hole and a second through hole in each intersection region, and
the one portion and the another portion of the first coil portion parted in each intersection region are electrically connected to the second coil portion via the first through hole and the second through hole, respectively.

2. The coil printed circuit board according to claim 1, wherein the first insulating layer has a third through hole between the inner end of the first coil portion and an inner end of the second coil portion, and the inner end of the first coil portion and the inner end of the second coil portion are electrically connected to each other via the third through hole.

3. The coil printed circuit board according to claim 1, wherein the first insulating layer has a fourth through hole between the outer end of the first coil portion and an outer end of the second coil portion, and the outer end of the first coil portion and the outer end of the second coil portion are electrically connected to each other via the fourth through hole.

4. The coil printed circuit board according to claim 1, wherein the lead portion has a width larger than a width of the first coil portion.

5. The coil printed circuit board according to claim 1, further comprising:
one or more second insulating layers respectively having a third surface and a fourth surface that are opposite to each other; and
a third coil portion spirally formed in a third region on the fourth surface of each second insulating layer, wherein
the third coil portion is electrically connected in parallel to the second coil portion,
each second insulating layer is laminated on the second surface of the first insulating layer or the fourth surface of another second insulating layer such that the third surface is closer to the second surface than the fourth surface and has a fifth through hole and a sixth through hole formed at positions respectively overlapping with the first through hole and the second through hole of the first insulating layer,
the first terminal is formed outside the first region on the first surface of the first insulating layer or outside the third region on the fourth surface of the second insulating layer provided at a position farthest from the first insulating layer,
the second terminal is formed outside the first region on the first surface of the first insulating layer or outside the third region on the fourth surface of the second insulating layer provided at a position farthest from the first insulating layer,
the one portion of the first coil portion parted in each intersection region is electrically connected to the third coil portion of each second insulating layer via the first through hole and the fifth through hole, and
the another portion of the first coil portion parted in said each intersection region is electrically connected to the third coil portion of each second insulating layer via the second through hole and the sixth through hole.

6. The coil printed circuit board according to claim 1, wherein the first terminal and the second terminal are formed on the first surface.

7. The coil printed circuit board according to claim 1, wherein a slit, extending in a circumferential direction, is formed in at least part of the first coil portion and the second coil portion.

8. A power reception module comprising the coil printed circuit board according to claim 1, wherein the first coil portion and the second coil portion of the coil printed circuit board are configured to receive power sent by electromagnetic induction or magnetic resonance.

9. A battery unit comprising:
the power reception module according to claim 8;
a secondary battery; and
a charger configured to charge the secondary battery by power received by the power reception module.

10. A power reception communication module comprising the coil printed circuit board according to claim 1, wherein the first coil portion and the second coil portion of the coil printed circuit board are configured to receive power sent by electromagnetic induction or magnetic resonance, one or more reception coil portions are formed on at least one surface of the first surface and the second surface of the first insulating layer of the coil printed circuit board, and each reception coil portion is configured to receive a signal sent by wireless communication.

11. A power reception communication module comprising the coil printed circuit board according to claim 5, wherein the first coil portion, the second coil portion and the third coil portion of the coil printed circuit board are configured to receive power sent by electromagnetic induction or magnetic resonance, one or more reception coil portions are formed on at least one surface of the first surface and the second surface of the first insulating layer and the third surface and the fourth surface of the one or more second insulating layers of the coil printed circuit board, and each reception coil portion is configured to receive a signal sent by wireless communication.

* * * * *